(12) United States Patent
Nakazaki et al.

(10) Patent No.: US 9,630,525 B2
(45) Date of Patent: Apr. 25, 2017

(54) SEAT DEVICE

(71) Applicant: FUJIKURA LTD., Tokyo (JP)

(72) Inventors: Shigeru Nakazaki, Sakura (JP); Tetsuya Kawahira, Tokyo (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/917,672

(22) PCT Filed: Sep. 9, 2014

(86) PCT No.: PCT/JP2014/073814
§ 371 (c)(1),
(2) Date: Mar. 9, 2016

(87) PCT Pub. No.: WO2015/037586
PCT Pub. Date: Mar. 19, 2015

(65) Prior Publication Data
US 2016/0214505 A1 Jul. 28, 2016

(30) Foreign Application Priority Data

Sep. 10, 2013 (JP) ................................. 2013-187777

(51) Int. Cl.
*B60N 2/00* (2006.01)
*B60N 2/70* (2006.01)

(52) U.S. Cl.
CPC ........... *B60N 2/002* (2013.01); *B60N 2/7094* (2013.01)

(58) Field of Classification Search
CPC ......... B60N 2/002; B60N 2/7094; B60N 2/70
(Continued)

(56) References Cited

U.S. PATENT DOCUMENTS

2003/0033885 A1 2/2003 Knox et al.
2011/0227380 A1 9/2011 Buntz et al.
(Continued)

FOREIGN PATENT DOCUMENTS

CN 101795902 A 8/2010
CN 102009630 A 4/2011
(Continued)

OTHER PUBLICATIONS

International Search Report dated Oct. 7, 2014, issued in counterpart International Application No. PCT/JP2014/073814 (1 page).
(Continued)

*Primary Examiner* — Milton Nelson, Jr.
(74) *Attorney, Agent, or Firm* — Westerman, Hattori, Daniels & Adrian, LLP

(57) ABSTRACT

A seat device 5 according to the present invention includes a cushion pad 60, a support member 70 for supporting the cushion pad 60, a pressure sensitive switch SW disposed with a spacing from the under face of the cushion pad, and a pressing member 90 disposed below the cushion pad 60 and deformed by a pressure applied from the under face of the cushion pad to press the pressure sensitive switch SW. The deformed amount of the pressing member 90 per unit displacement amount in which the under face of the cushion pad is displaced downwardly is greater in a second stage after the pressure sensitive switch SW is turned on than in a first stage before the pressure sensitive switch SW is turned on.

12 Claims, 20 Drawing Sheets

(58) Field of Classification Search
USPC .......................................... 297/217.2, 217.3
See application file for complete search history.

(56) References Cited

U.S. PATENT DOCUMENTS

| | | |
|---|---|---|
| 2013/0192904 A1 | 8/2013 | Sprecher |
| 2015/0123436 A1* | 5/2015 | Boyer .................... B60N 2/646 |
| | | 297/217.2 |
| 2015/0369650 A1 | 12/2015 | Takayasu et al. |

FOREIGN PATENT DOCUMENTS

| | | |
|---|---|---|
| CN | 103223913 A | 7/2013 |
| EP | 1961625 B1 | 8/2008 |
| JP | 10-211836 A | 8/1998 |
| JP | 2013-111423 A | 6/2013 |

OTHER PUBLICATIONS

Office Action dated Jun. 14, 2016, issued in counterpart Chinese Patent Application No. 201480049458.4, with English translation. (7 pages).
Chinese Office Action dated Nov. 30, 2016, issued in corresponding Chinese Patent Application No. 201480049458.4.

\* cited by examiner

SEAT DEVICE

TECHNICAL FIELD

The present invention relates to a seat device suitable in the technical field of detecting that a person takes a seat of a vehicle, for example.

BACKGROUND ART

For one of the safety systems of vehicles, an alarm system is commercially available. The alarm system gives a warning that a person on a car does not wear a seat belt. In the case in which the alarm system detects that a person takes a seat but not wear a seat belt, the alarm system gives a warning. For a seat device for use in such alarm systems, Patent Literature 1 below is proposed.

A seat device according to Patent Literature 1 includes a flexible seat pressure sensitive switch (PSS/PSS2) accommodated in a recess (C1a) formed on the back face of a seat cushion (C1) and an elastic stopper (C2) in contact with the under face of the pressure sensitive switch (PSS/PSS2) to close the recess (C1a).

In this seat device, a load applied to one point is dispersed by the seat cushion (C1). Thus, no large load is locally applied to the pressure sensitive switch (PSS/PSS2), which allows the pressure sensitive switch (PSS/PSS2) to have a high durability.

[Patent Literature 1] JP-A-10-211836

SUMMARY OF INVENTION

However, in the seat device according to Patent Literature above, the pressure sensitive switch (PSS/PSS2) is disposed inside the seat cushion (C1). Consequently, in the case in which an object lighter than a human in weight is placed, the pressure sensitive switch (PSS/PSS2) is turned on to often make a wrong detection.

Depending on the weight of a person sitting on the seat cushion (C1), an excess pressure is continuously applied to the pressure sensitive switch (PSS/PSS2), often causing the degradation of the durability of the pressure sensitive switch (PSS/PSS2).

Therefore, it is an object of the present invention is to provide a seat device that can appropriately detect that a person takes a seat with the durability of a pressure sensitive switch being improved.

To achieve the above object, a seat device of the present invention includes: a cushion pad; a support member for supporting the cushion pad; a pressure sensitive switch disposed with a spacing from an under face of the cushion pad; and a pressing member disposed below the cushion pad, the pressing member being deformed by a pressure applied from the under face of the cushion pad to press the pressure sensitive switch, and a deformed amount of a part of the pressing member per unit displacement amount in which the under face of the cushion pad is displaced downwardly is greater in a second stage after the pressure sensitive switch is turned on than in a first stage before the pressure sensitive switch is turned on.

The position of the under face of the cushion pad supported on the support member is hardly displaced in the case in which an object lighter than a human in weight is placed, whereas the position is largely displaced downwardly in the case in which a person takes a seat. The pressure sensitive switch is disposed with a spacing from the under face of the cushion pad, in which such displacement occurs.

Therefore, in the case in which an object is placed on the cushion pad, the relative position between the cushion pad and the pressure sensitive switch is hardly displaced. Consequently, making a wrong detection, which is caused by the pressure sensitive switch being turned on, is reduced. On the other hand, in the case in which a person takes a seat, the relative position between the cushion pad and the pressure sensitive switch is changed to turn on the pressure sensitive switch.

The seat device according to the present invention includes the pressing member deformed by a pressure applied from the under face of the cushion pad to press the pressure sensitive switch. Thus, the pressing member applies repulsion force against pressing force applied from the under face of the cushion pad in response to a person taking a seat. Consequently, a pressure applied from the cushion pad to the pressure sensitive switch is relaxed.

In addition, the deformed amount of a part of the pressing member per unit displacement amount in which the under face of the cushion pad is displaced downwardly is greater in the second stage after the pressure sensitive switch is turned on than in the first stage before the pressure sensitive switch is turned on.

Thus, even though the under face of the cushion pad is largely displaced downwardly, the pressing member can make the level of the pressing force applied from the under face of the cushion pad to the pressure sensitive switch similar in the first stage before the pressure sensitive switch is turned on and in the second stage after the pressure sensitive switch is turned on.

Therefore, even though an excess pressing force is applied from the cushion pad as in the case in which a person more heavily weighted than ordinary people takes a seat, for example, the pressing force from the cushion pad to the pressure sensitive switch can be relaxed. Accordingly, the durability of the pressure sensitive switch can be improved.

Preferably, the pressing member has a first flexible portion and a second flexible portion joined to the first flexible portion. The second flexible portion is bent after a bending amount of the first flexible portion exceeds a predetermined amount.

In this case, before the bending amount of the first flexible portion exceeds a predetermined amount, the second flexible portion can press and turn on the pressure sensitive switch. In the case in which an excess load exceeding a predetermined amount is applied, the second flexible portion is bent. Consequently, the pressing force from the cushion pad to the pressure sensitive switch can be relaxed.

Preferably, the pressing member has a first flexible portion and a second flexible portion joined to the first flexible portion. The second flexible portion has a bending amount greater than a bending amount of the first flexible portion per unit pressure.

In this case, the flexible portions having different bending amounts per unit pressure are provided. Consequently, the second flexible portion can be bent after the switch is turned on. Thus, the pressing force from the cushion pad to the pressure sensitive switch can be relaxed.

Preferably, the seat device includes a base disposed in a region in which the base does not overlap with switching devices configuring the pressure sensitive switch in a vertical direction. The base is joined to the first flexible portion or the second flexible portion.

In this case, pressing force from the cushion pad to the pressure sensitive switch can be appropriately relaxed, compared with the case in which the base is disposed in a region in which the base overlaps with the switching device in the vertical direction.

Preferably, the pressure sensitive switch includes a first pressure sensitive switch and a second pressure sensitive switch. The pressing member includes a first pressing member deformed by a pressure applied from the under face of the cushion pad to press the first pressure sensitive switch and a second pressing member deformed by a pressure applied from the under face of the cushion pad to press the second pressure sensitive switch. The first pressure sensitive switch is turned on through the first pressing member when a first weight or greater is applied from a seat face of the cushion pad. The second pressure sensitive switch is turned on through the second pressing member when a second weight that is greater than the first weight or greater is applied from the seat face of the cushion pad.

In this case, the difference in weights applied to the cushion pad can be obtained in two patterns, i.e., the case in which only the first pressure sensitive switch is turned on, and the case in which both of the first pressure sensitive switch and the second pressure sensitive switch are turned on. Therefore, persons in different weights can be distinguished from each other.

Preferably, the seat device further includes a reinforcing member provided between the pressing member and the cushion pad opposed to the pressing member, the reinforcing member having rigidity greater than rigidity of the cushion pad. The reinforcing member is moved together with the cushion pad being displaced.

In the case in which such a reinforcing member is provided, even though the degradation over time of the cushion pad causes the under face of the cushion pad to fall downwardly, it is possible to prevent a portion of the cushion pad opposed to the reinforcing member from falling downwardly below the reinforcing member. Therefore, it is possible to reduce the degradation of the accuracy of distinguishing between a person and an object or between persons in different weights caused by the under face of the cushion pad falling downwardly. In addition to this, even though the under face of the cushion pad has projections and depressions, it is possible to reduce the degradation of the accuracy of distinguishing between a person and an object or between persons in different weights caused by the projections and depressions.

Preferably, the seat device further includes a member that is not moved together with the cushion pad being displaced due to a person taking a seat. The pressure sensitive switch is supported on the member with a spacing from the under face of the cushion pad.

In this case, the pressure sensitive switch is supported on the member, which is not moved together with the cushion pad being displaced due to a person taking a seat. Consequently, even though the cushion pad is displaced, the position of the pressure sensitive switch is not displaced. Therefore, in the case in which an object is placed on the cushion pad, the relative position between the cushion pad and the pressure sensitive switch is hardly displaced. Thus, making a wrong detection, which is caused by the pressure sensitive switch being turned on, is reduced. On the other hand, in the case in which a person takes a seat, the relative position between the cushion pad and the pressure sensitive switch is changed to turn on the pressure sensitive switch. Accordingly, a person and an object can be appropriately distinguished from each other.

Preferably, the member is integrally formed with the support member. In this case, displacement caused by vibrations is avoided. Thus, a person taking a seat can be more appropriately detected, compared with the case in which the support member is not integrally shaped with the member, which is not moved together with the cushion pad being displaced due to a person taking a seat.

In the seat device, a configuration below is also possible. The support member includes a frame member having an opening and a plurality of springs extended over the opening. The seat device further includes a sensor mounting stage mounted on a part of the plurality of springs. The pressure sensitive switch is disposed on the sensor mounting stage with a spacing from the under face of the cushion pad.

Preferably, in the case in which the pressure sensitive switch is disposed on the sensor mounting stage, a portion of the pressure sensitive switch nearest to the under face of the cushion pad is located lower than a portion of the sensor mounting stage nearest to the under face of the cushion pad.

In this case, when the degradation over time of the cushion pad causes the under face of the cushion pad to fall downwardly, the under face of the cushion pad is supported on the sensor mounting stage. Therefore, in the case in which the under face of the cushion pad falls downwardly, it is possible to reduce the occurrence of an event in which the pressure sensitive switch is continuously on. The portion of the pressure sensitive switch nearest to the under face of the cushion pad is located lower than the portion of the sensor mounting stage nearest to the under face of the cushion pad. Consequently, in the case in which a load is applied, the under face of the cushion pad is first supported on the sensor mounting stage, and the relative position between the cushion pad and the pressure sensitive switch is hardly displaced. After that, a load is further applied, and then the pressure sensitive switch is turned on. Thus, making a wrong detection, which is caused by the pressure sensitive switch being turned on, is reduced. Accordingly, the accuracy of distinguishing between a person and an object or between persons in different weights is improved.

Preferably, in the case in which the pressure sensitive switch is disposed on the sensor mounting stage, a portion of the pressing member nearest to the under face of the cushion pad is located lower than a portion of the sensor mounting stage nearest to the under face of the cushion pad.

In this case, it is possible to further reduce the occurrence of an event in which the pressure sensitive switch is continuously on in the case in which the under face of the cushion pad falls downwardly. Moreover, the accuracy of distinguishing between a person and an object or between persons in different weights is further improved.

As described above, according to the present invention, it is possible to implement a seat device that can appropriately detect that a person takes a seat with the durability of a pressure sensitive switch being improved.

DESCRIPTION OF EMBODIMENTS

(1) First Embodiment

A first embodiment for implementing the present invention will be described in detail with reference to the drawings.

Figure 1:
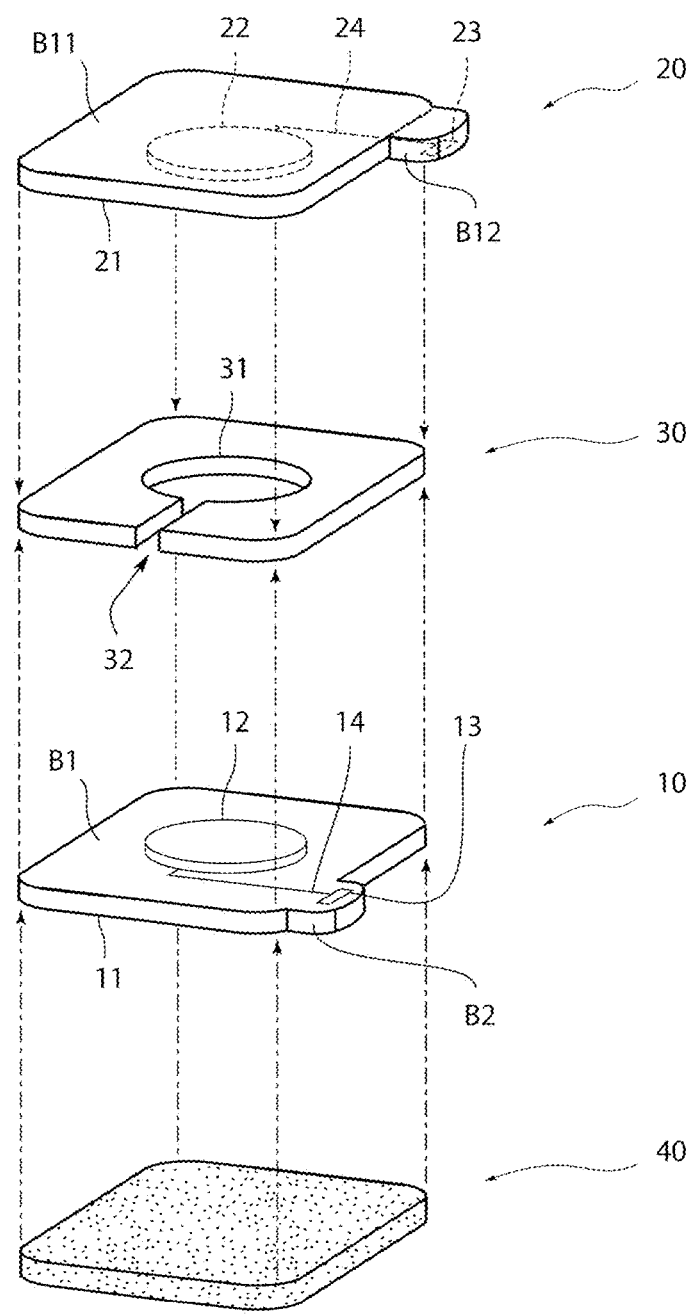
FIG. 1 is an exploded diagram of the configuration of a seat sensor for use in a seat device.

FIG. 1 is an exploded diagram of the configuration of a seat sensor 1 for use in a seat device. As illustrated in FIG. 1, the seat sensor 1 includes a pressure sensitive switch and a cushion member 40 as main components. The pressure sensitive switch includes a first electrode sheet 10, a second electrode sheet 20, and a spacer 30 as main components.

The first electrode sheet 10 has a first insulating sheet 11, a first electrode 12, and a terminal 13.

The first insulating sheet 11 is a flexible film insulating sheet in a rectangle, for example. In the case of the embodiment, the first insulating sheet 11 is formed of a main block B1 on which the first electrode 12 is disposed and a sub-block B2 on which the terminal 13 is disposed. The sub-block B2 is smaller than the main block B1, and is joined to the end portion of the main block B1 in the longitudinal direction.

The material of the first insulating sheet 11 can be a resin, such as polyethylene terephthalate (PET), polybutylene terephthalate (PBT), or polyethylene naphthalate (PEN).

The first electrode 12 is one of switching devices forming a switch, and is a metal printed layer in a nearly circular shape, for example. The first electrode 12 is disposed on one surface of the main block B1.

The terminal 13 is a conductive layer, which is a metal sheet in a nearly rectangle, for example. The terminal 13 is disposed on the surface of the sub-block B2, which is located on the same side as the first electrode 12 is disposed. The terminal 13 is electrically connected to the first electrode 12 through a first wire 14, and is electrically connected to the electric control unit of a vehicle through a wire, not illustrated.

Similarly to the first electrode sheet 10, the second electrode sheet 20 has a second insulating sheet 21, a second electrode 22, and a terminal 23.

The second insulating sheet 21 is a flexible film insulating sheet in a rectangle, for example. In the case of the embodiment, the second insulating sheet 21 is formed of a main block B11 on which the second electrode 22 is disposed and a sub-block B12 on which the terminal 23 is disposed. The main block B11 has the same shape and the same size as the shape and size of the main block B1 of the first insulating sheet 11. The sub-block B12 has the same shape and the same size as the shape and size of the sub-block B2 of the first insulating sheet 11. The position of the sub-block B12 joined to the main block B11 is relatively different from the position of the sub-block B2 joined to the main block B1 of the first insulating sheet 11.

Similarly to the first insulating sheet 11, the material of the second insulating sheet 21 can be a resin, such as PET, PBT, or PEN. The material of the second insulating sheet 21 may be the same as or different from the material of the first insulating sheet 11.

The second electrode 22 is the other of the switching devices forming the switch, and is a metal printed layer in a nearly circular shape, for example. The second electrode 22 is disposed on the surface of the main block B11. In the case of the embodiment, the size of the second electrode 22 is the same as the size of the first electrode 12. The second electrode 22 is disposed at a position relatively the same as the position at which the first electrode 12 of the main block B1 is disposed.

The terminal 23 is a conductive layer, which is a metal sheet in a nearly rectangle, for example. The terminal 23 is disposed on the surface of the sub-block B12, which is located on the same side as the first electrode 12 is disposed. The terminal 23 is electrically connected to the second electrode 22 through a second wire 24, and is electrically connected to the electric control unit of the vehicle through a wire, not illustrated.

The spacer 30 is a film insulating sheet, and has an opening 31. In the case of the embodiment, the spacer 30 has the same shape and the same size as the shape and size of the main block B1 of the first insulating sheet 11. Similarly to the first and second insulating sheets 11 and 21, the material of the spacer 30 can be a resin, such as PET, PBT, or PEN. The material of the spacer 30 may be the same as or different from the material of the first insulating sheet 11 or the second insulating sheet 21.

The shape of the edge of the opening 31 is in a nearly circular shape, for example. The diameter of the opening 31 is slightly smaller than the diameter of the first electrode 12 and the diameter of the second electrode 22. The opening 31 is disposed at the position relatively the same as the position at which the main block B1 of the first electrode 12 is disposed.

The opening 31 is formed with a slit 32 spatially connected to the outside of the spacer 30. In other words, one end of the slit 32 is joined to the corresponding opening 31, and the other end is opened to the lateral side of the spacer 30.

The cushion member 40 is an elastic member that is deformed in such a manner that the cushion member 40 is crushed when a pressure is applied. For example, the cushion member 40 is formed of a sponge-like resin with a large number of holes, nonwoven fabric with entangled resin fiber, rubber, or the like. In the case of the embodiment, the cushion member 40 is in a nearly rectangular parallelepiped. The wide side is the same as the wide side of the main block B1 of the first insulating sheet 11.

Figure 2A:
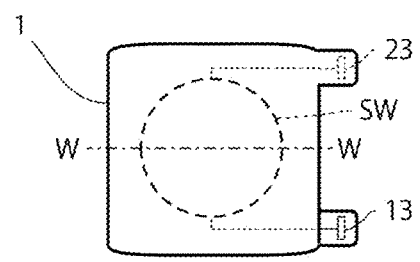
FIGS. 2A and 2B are diagrams each illustrating the appearance and the cross section of the seat sensor.
Figure 2B:
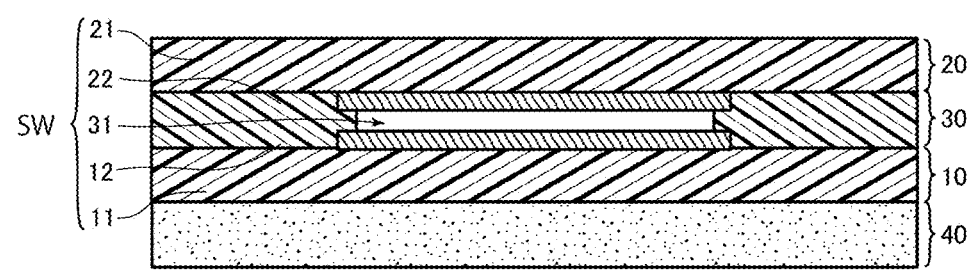

FIGS. 2A and 2B are diagrams of the appearance and the cross section of the seat sensor 1. More specifically, FIG. 2A is a diagram of the seat sensor 1 viewed from the upper side. FIG. 2B is a cross sectional view taken along line W-W in FIG. 2A.

As illustrated in FIGS. 2A and 2B, the first electrode sheet 10 is attached to one side of the spacer 30, and the second electrode sheet 20 is attached to the other side of the spacer 30. Thus, a pressure sensitive switch SW is configured. In other words, the pressure sensitive switch SW is a membrane switch including a part of a pair of the insulating sheets 11 and 21, the spacer disposed between the sheets, and a pair of the electrodes 12 and 22 opposed to each other through the opening 31 provided on the spacer. A part of the insulating sheets 11 and 21 is a region on which at least the electrodes are disposed. In other words, the pressure sensitive switch SW is a membrane switch. In the pressure sensitive switch SW, one of the switching devices is the first electrode 12, and the other of the switching devices is the second electrode 22.

The cushion member 40 is attached to the surface of one of the insulating sheets of the pressure sensitive switch SW. Thus, the seat sensor 1 is configured. In the case of the embodiment, the cushion member 40 is attached to the face of the first insulating sheet 11 of the pressure sensitive switch SW on the opposite side of the spacer 30.

Figure 3:
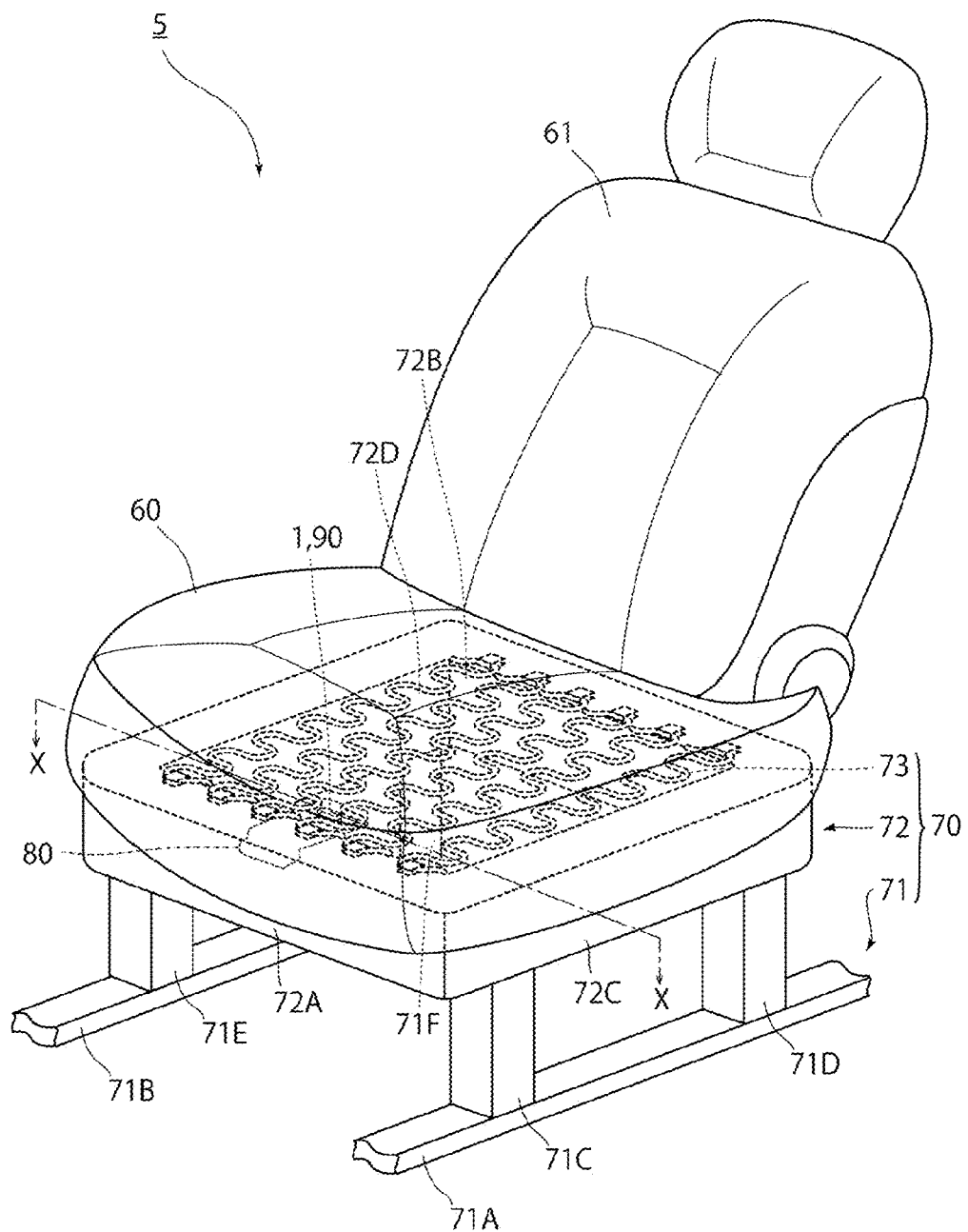
FIG. 3 is a diagram of the seat device viewed obliquely.

Next, a seat device 5 having the above-described seat sensor 1 will be described. FIG. 3 is a diagram of the seat device 5 viewed obliquely. In FIG. 3, for convenience, the seat sensor 1 and a pressing member 90 are illustrated in a nearly rectangular parallelepiped.

As illustrated in FIG. 3, the seat device 5 includes a cushion pad 60, a cushion mounting unit 70, a sensor mounting stage 80, the above-described seat sensor 1, and the pressing member 90 as main components. In FIG. 3, for convenience, the seat sensor 1 and the pressing member 90 are simply illustrated.

The cushion pad 60 is a member on which a person takes a seat. The cushion pad 60 is an elastic member that is deformed in such a manner that the cushion pad 60 is crushed when a pressure is applied. The material of the elastic member can be urethane foam, for example. In the case of the embodiment, a backrest member 61 is joined to the rear end of the cushion pad 60.

The cushion mounting unit 70 is a support member for supporting the cushion pad 60. In the embodiment, the cushion mounting unit 70 has a stand 71, a support frame 72, and a plurality of springs 73. The stand 71 is a base member that supports the cushion pad 60. The stand 71 has rigidity in a degree or more in which the stand 71 is not deformed by a pressure applied to the cushion pad 60 due to a person taking a seat.

In the case of the embodiment, the stand 71 is configured of a left base leg 71A and a right base leg 71B disposed in parallel with each other, a left front leg 71C and a left rear leg 71D erected on the left base leg 71A, and a right front leg 71E and a right rear leg 71F erected on the right base leg 71B. For example, the materials of the legs 71A to 71F can be a metal or ceramics.

The support frame 72 is a frame member that supports the plurality of springs 73, and is fixed to the stand 71. Similarly to the stand 71, the support frame 72 has rigidity in a degree or more in which the support frame 72 is not deformed by a pressure applied to the cushion pad 60 due to a person taking a seat.

In the case of the embodiment, the support frame 72 is configured of a front frame 72A, a rear frame 72B, a left frame 72C, and a right frame 72D. The frames 72A to 72D are fixed to the top ends of the left front leg 71C, the left rear leg 71D, the right front leg 71E, and the right rear leg 71F.

For example, the materials of the frames 72A to 72D can be a metal or ceramics. The materials of the frames 72A to 72D may be the same as or different from the materials of the legs 71A to 71F. The frames 72A to 72D may be integrally shaped with the legs 71A to 71F.

The plurality of springs 73 is members on which the cushion pad 60 is placed. The plurality of springs 73 is extended side by side on the opening of the support frame 72.

In the case of the embodiment, the springs 73 are metal members repeatedly bent in an S-shape on the same plane. The cross sectional shape is a circular shape, for example. The front ends of the springs 73 are mounted on the front frame 72A. The rear ends are mounted on the rear frame 72B. Thus, the plurality of springs 73 is extended on the top end opening of the support frame 72 along the longitudinal direction of the cushion pad 60 with a predetermined spacing. Consequently, the plurality of springs 73 is configured as a mat for the cushion pad 60.

The sensor mounting stage 80 is a member on which at least the pressure sensitive switch SW of the seat sensor 1 is mounted. The sensor mounting stage 80 has rigidity in a degree or more in which the sensor mounting stage 80 is not deformed by a pressure applied to the cushion pad 60 due to a person taking a seat. For example, the sensor mounting stage 80 according to the embodiment is in a plate shape. One end of the sensor mounting stage 80 is fixed to the side face of the front frame 72A below the bottom of the springs, and the other end is an open end.

For example, the material of the sensor mounting stage 80 can be a metal or resin. The material of the sensor mounting stage 80 may be the same as or different from the material of the stand 71 or the support frame 72.

Figure 4:
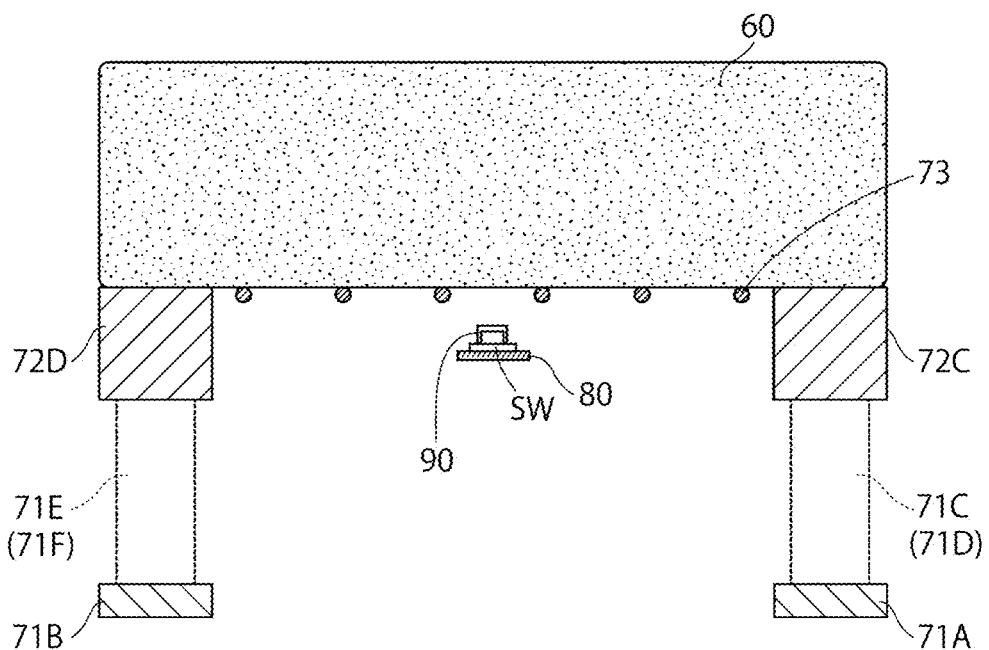
FIG. 4 is a cross sectional view taken along line X-X in FIG. 3.

FIG. 4 is a cross sectional view taken along line X-X in FIG. 3. In FIG. 4, for convenience, the seat sensor 1 and the pressing member 90 are simply illustrated. As illustrated in FIG. 4, the pressure sensitive switch SW of the seat sensor 1 is disposed below the cushion pad 60 between the adjacent springs 73, and supported on the support frame 72 through the sensor mounting stage 80.

In other words, the pressure sensitive switch SW is supported at a position at which the pressure sensitive switch SW overlaps with no springs 73 in the vertical direction of the spring 73 with a spacing from the under face of the cushion pad. In other words, the pressure sensitive switch SW is disposed at the position different from the position at which the springs 73 are disposed in the height direction of the seat device 5. In the case in which the springs 73 are viewed right above, the pressure sensitive switch SW is apart from the springs 73, and the pressure sensitive switch SW overlaps with no springs 73.

The pressure sensitive switch SW thus disposed on the sensor mounting stage 80 is connected to the electronic control unit (ECU) of the vehicle through the terminals 13 and 23 of the seat sensor 1 having the pressure sensitive switch SW.

Figure 5:
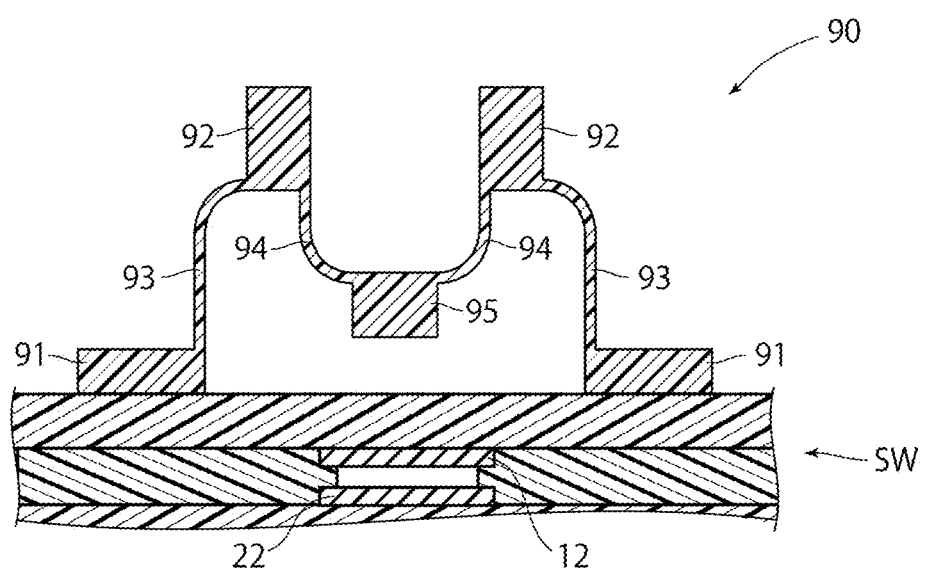
FIG. 5 is an enlarged diagram of a part of FIG. 4.

FIG. 5 is an enlarged diagram of a part of FIG. 4. The pressing member 90 is an elastic member that is deformed by a pressure applied from the under face of the cushion pad to press the pressure sensitive switch SW. In the case of the embodiment, as illustrated in FIG. 5, the pressing member 90 is a rubber member integrally shaped with a base 91, a pad rest 92, a first flexible portion 93, and a second flexible portion 94.

The base 91 is the base of the pressing member 90. The base 91 is disposed in the region in which the base 91 does not overlap with the switching devices (the first and second electrodes 12 and 22) configuring the pressure sensitive switch SW in the vertical direction. In the case of the embodiment, the base 91 is in a plate shape having an opening. The base 91 is fixed to the face of the pressure sensitive switch SW opposed to the under face of the cushion pad (on the opposite side of the face of the second insulating sheet 21 opposed to the spacer 30) with an adhesive, for example, with the opening being located in the vertical direction of the switching devices (the first and second electrodes 12 and 22).

The pad rest 92 has a face opposed to the under face of the cushion pad. The pad rest 92 is applied with a pressure applied from the cushion pad 60. The pad rest 92 is supported on the first flexible portion 93 above the opening formed on the base 91 with a predetermined spacing. In the case of the embodiment, the pad rest 92 is in a tubular shape having an outer diameter smaller than the diameter of the opening formed on the base 91.

The first flexible portion 93 is joined to the base 91 and the pad rest 92 for supporting the pad rest 92, and is bent by a pressure applied from the cushion pad 60 in contact with the pad rest 92. The first flexible portion 93 covers the opening opposed to the under face of the cushion pad together with the pad rest 92. In the case of the embodiment, the first flexible portion 93 is configured of a tubular portion and a hollow portion in a nearly circular truncated cone. The tubular portion is extended from the opening edge on one face of the base 91 in the direction orthogonal to the one face. The hollow portion is bent from the tip end of the tubular portion on the inner side, and reaches the side face of the pad rest 92.

The second flexible portion 94 is provided between the pad rest 92 and the pressure sensitive switch SW disposed on the opening of the base 91. The second flexible portion 94 is moved in the direction of the opening in response to the bending of the first flexible portion 93 to press the pressure sensitive switch SW. The second flexible portion 94 is bent after the bending amount of the first flexible portion 93 exceeds a predetermined amount. The bending amount of the second flexible portion 94 per unit pressure may be the same as or different from the bending amount of the first flexible portion 93 per unit pressure. The bending amount means a degree in which a component is deformed after a pressure is applied.

In the case of the embodiment, the second flexible portion 94 is in a hollow, spherical crown shape extending from the opening edge on one end face of the pad rest 92 on the base side toward the base. At the center of the second flexible portion 94, a projection 95 is formed to press the pressure sensitive switch SW. The projection 95 is disposed in a region in which the projection 95 overlaps with the opening 31 provided between the switching devices configuring the pressure sensitive switch SW in the vertical direction.

Figure 6:
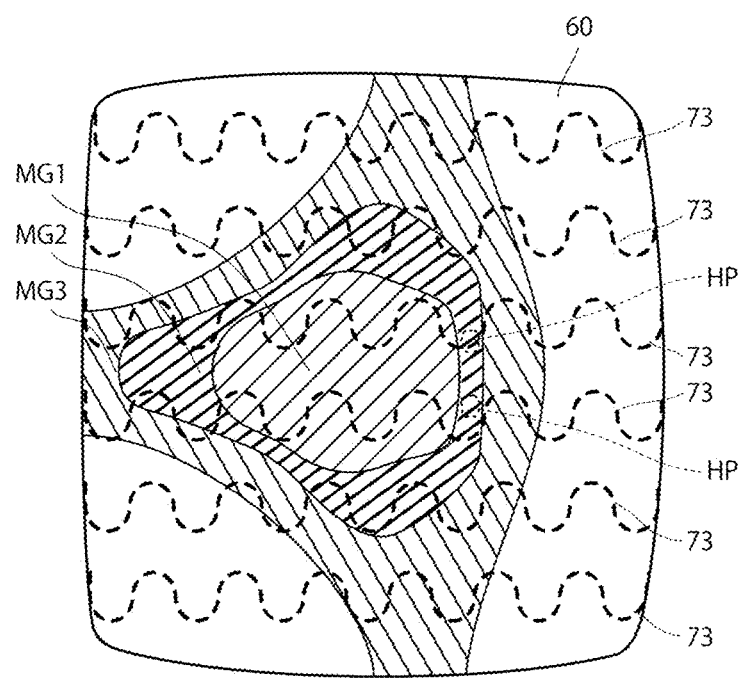
FIG. 6 is a diagram of the distribution of a load applied to the under face of a cushion pad.

FIG. 6 is a diagram of the distribution of a load applied to the under face of the cushion pad. In FIG. 6, the left side corresponds to the front side of the cushion pad 60, and the right side corresponds to the rear side of the cushion pad 60.

As illustrated in FIG. 6, when a person properly takes a seat, a load applied to the under face of the cushion pad is greater in a region including hip points HP and the forward region of the hip points HP than in the rear of this region. The term "a person properly takes a seat" means that the person takes a seat in such a manner that the buttocks of the person are positioned deeply back on the seat face and the back of the person is in contact with the backrest. The term "hip points" mean the lowest portions of the buttocks.

The distribution of a load applied to the under face of the cushion pad when a person properly takes a seat is roughly separated into three regions, a first region MG1, a second region MG2, and a third the region MG3. Based on an area of the under face of the cushion pad to which the largest load is applied when a person properly takes a seat (in the following, referred to as a largest load applied area), in the first region MG1, its applied load is 90% or more of a load applied to the largest load applied area. On the other hand, in the second region MG2, its applied load is 80% or more and less than 90% of a load applied to the largest load applied area. In the third the region MG3, its applied load is 10% or more and less than 80% of a load applied to the largest load applied area. The first region MG1 and the second region MG2 roughly correspond to the center region of the seat face of the cushion pad.

In the case of the embodiment, the sensor mounting stage 80 is disposed below any one of the first to third regions MG1 to MG3 and below the bottom of the spring. The pressure sensitive switch SW and the pressing member 90 are disposed on the sensor mounting stage 80.

Figure 7:
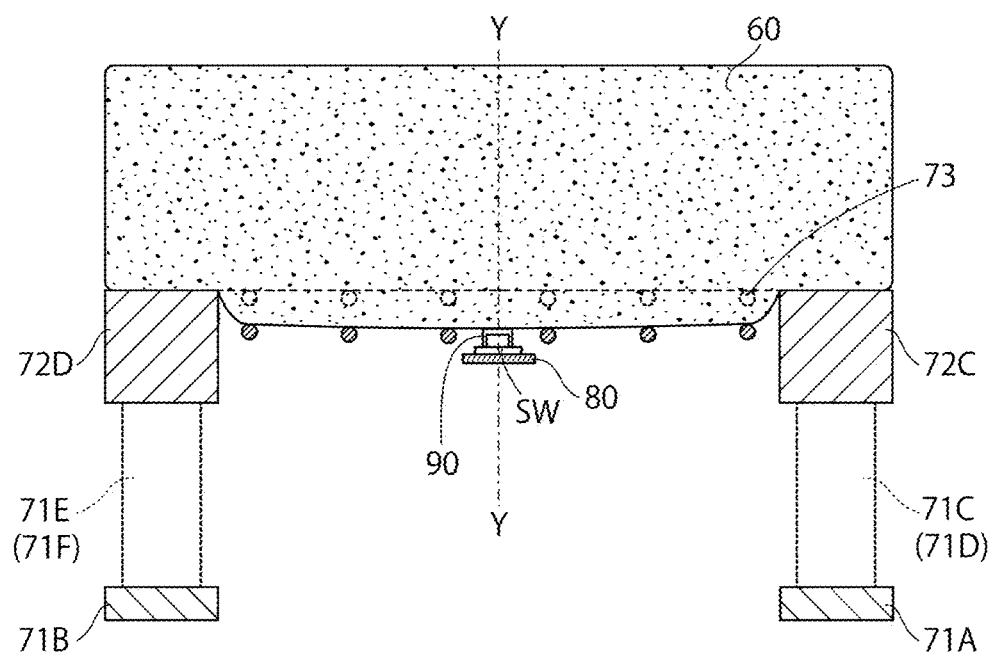
FIG. 7 is a diagram in the case in which a person takes a seat on the seat device, similarly viewed as in FIG. 4.

FIG. 7 is a diagram in the case in which a person takes a seat on the seat device 5, similarly viewed as in FIG. 4. As illustrated in FIG. 7, in the case in which a person takes a seat on the cushion pad 60, a load is applied to the seat face of the cushion pad 60. Consequently, a pressure is generated from the seat face of the cushion pad 60.

The pressure is transmitted to the lower part of the cushion pad 60 to deform the under face of the cushion pad on the front side of the hip points and the bottom of the spring in such a manner that they fall overall. Consequently, the cushion pad 60 is lowered from a reference position, which is expressed by a broken line, when no pressure is applied.

Figure 8A:
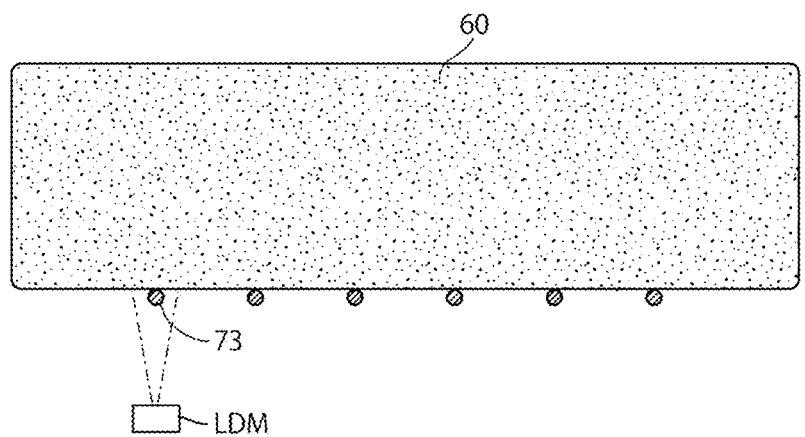
FIGS. 8A and 8B are diagrams each illustrating the measured state of displacement of the under face of the cushion pad and the bottom of a spring and the measured result when a person takes a seat on the cushion pad.
Figure 8B:
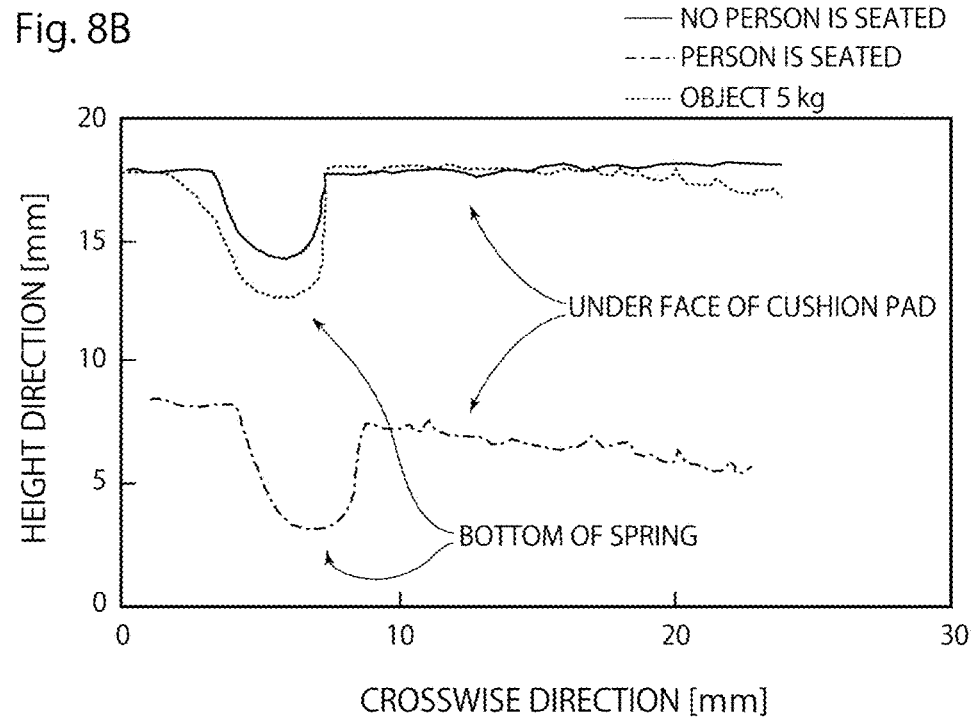

FIGS. 8A and 8B are diagrams of the measured state of displacement of the under face of the cushion pad and the bottom of the spring and the measured result when a person takes a seat on the cushion pad 60. More specifically, FIG. 8A is a cross sectional view of the measured state of displacement of the under face of the cushion pad and the bottom of the spring. FIG. 8B is a graph of the displacement amounts of the under face of the cushion pad and the bottom of the spring.

As illustrated in FIG. 8A, the displacement of the under face of the cushion pad and the bottom of the spring was measured using a laser displacement gage LDM disposed on the front side of the hip points and below the bottom of the spring.

As illustrated in FIG. 8B, in the case in which a person takes a seat on the cushion pad 60, the under face of the cushion pad and the bottom of the spring are largely displaced across the end portions of the cushion pad 60 in the lateral direction more than in the case in which an object is placed on the cushion pad 60.

In FIG. 8B, the horizontal axis expresses that the right side of the axis is the nearest to the center part of the cushion pad 60 in the lateral direction (in the crosswise direction), and the left side is the nearest to the end portions of the cushion pad 60 in the lateral direction.

Figure 9A:
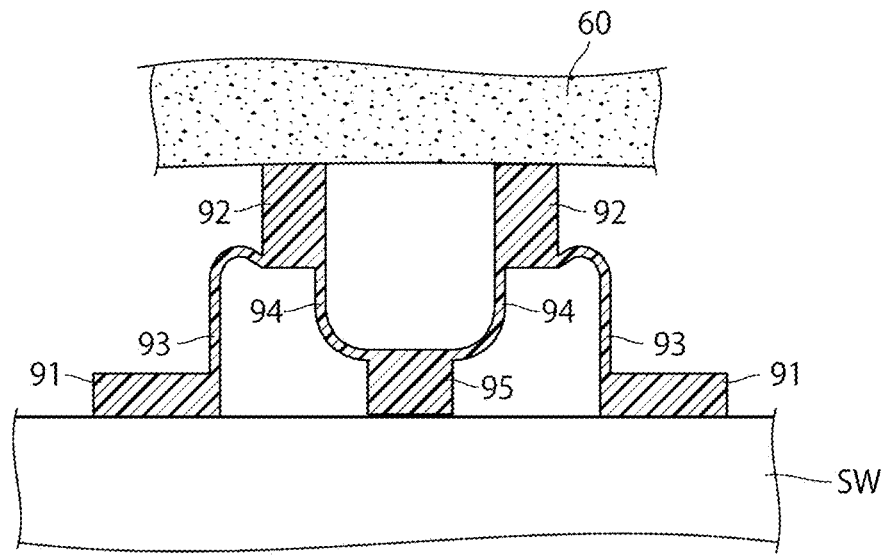
FIGS. 9A and 9B are diagrams each illustrating a pressing member in the case in which a person takes a seat on the seat device, similarly viewed as in FIG. 5.
Figure 9B:
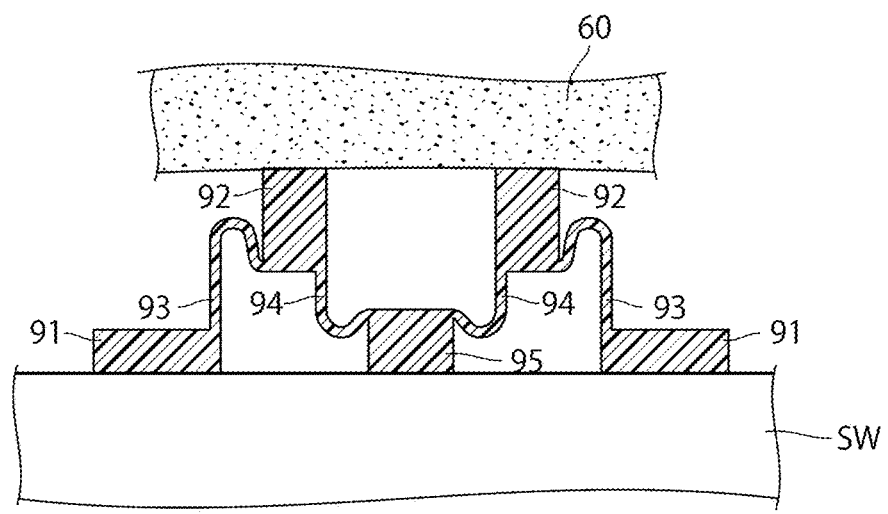

FIGS. 9A and 9B are diagrams of the pressing member 90 in the case in which a person takes a seat on the seat device 5, similarly viewed as in FIG. 5. More specifically, FIG. 9A is a diagram of the pressing member 90 in the case in which a light-weight person takes a seat. FIG. 9B is a diagram of the pressing member 90 in the case in which a heavy-weight person takes a seat.

As illustrated in FIGS. 9A and 9B, in the case in which a person takes a seat, the pad rest 92 of the pressing member 90 contacts the under face of the cushion pad displaced from the reference position caused by the seating. Consequently, a pressure is applied to the pad rest 92.

Here, in the case in which the weight of a person taking a seat is a predetermined threshold or less, as illustrated in FIG. 9A, the first flexible portion 93 of the pressing member 90 is bent by a pressure applied from the cushion pad 60 to press down the pad rest 92. The projection 95 of the second flexible portion 94 joined to the pad rest 92 then presses the pressure sensitive switch SW.

In the pressing, the second flexible portion 94 is hardly bent, and the pressing force from the cushion pad 60 to the pressure sensitive switch SW is relaxed by the repulsion force of the first flexible portion 93.

On the other hand, in the case in which the weight of a person taking a seat exceeds a predetermined threshold, as illustrated in FIG. 9B, a larger pressure is applied from the cushion pad 60 to the pad rest 92 than in the case in which the weight is the threshold or less. Consequently, the first flexible portion 93 of the pressing member 90 is more largely bent to press down the pad rest 92. Thus, the projection 95 of the second flexible portion 94 joined to the pad rest 92 presses the pressure sensitive switch SW.

In the pressing, the second flexible portion 94 is bent. The pressing force from the cushion pad 60 to the pressure sensitive switch SW is relaxed by the repulsion force of the first flexible portion 93 and the repulsion force of the second flexible portion 94.

As described above, when the under face of the cushion pad is located below the position of the under face of the cushion pad in turning on the pressure sensitive switch SW, the pressing member 90 has a larger deformed amount than its deformed amount when the pressure sensitive switch SW is turned on.

Figure 10A:
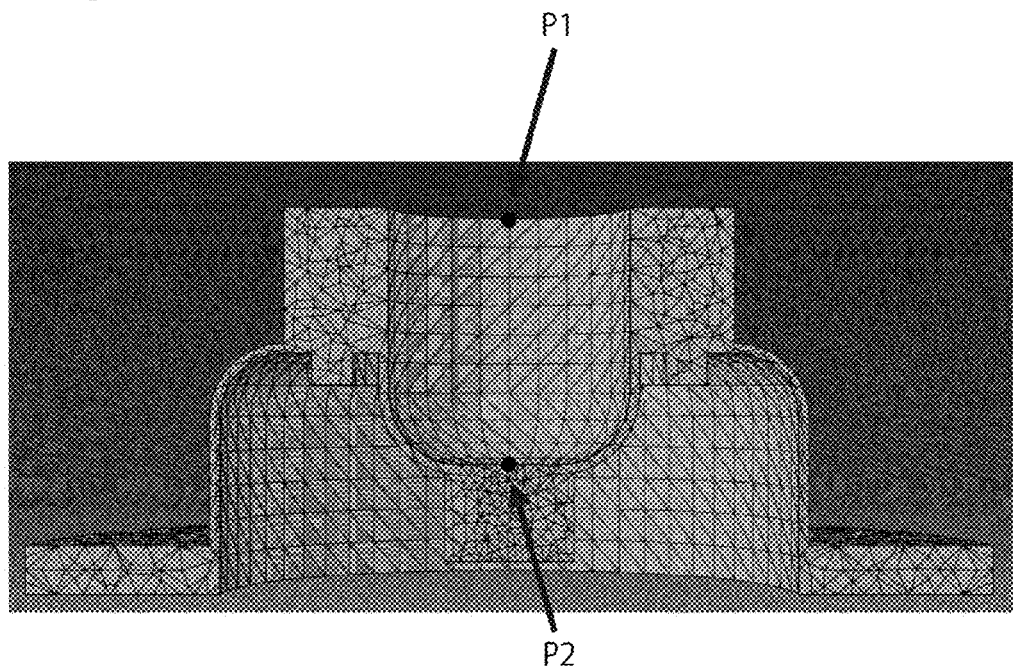
FIGS. 10A and 10B are diagrams each illustrating the pressing member being changed.
Figure 10B:
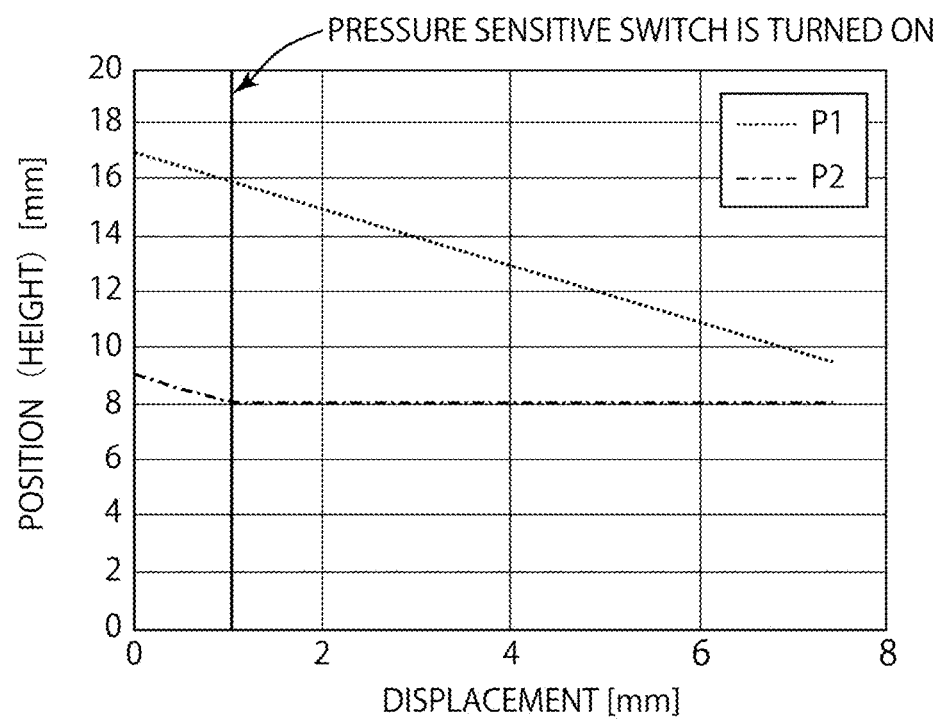

FIGS. 10A and 10B are diagrams of changes in the pressing member 90. More specifically, FIG. 10A is a diagram of points to focus attention on changes in the pressing member 90. FIG. 10B is a graph of the relationship between the displacement amount and the absolute position on the focus points on the pressing member 90.

In FIG. 10A, P1 is the intersection point of the top face of the pad rest 92 with the vertical line passing the center of gravity of the pressing member 90. P2 is the intersection point of the boundary surface of the second flexible portion 94 and the projection 95 with the vertical line passing the center of gravity of the pressing member 90.

In FIG. 10B, the horizontal axis of the graph expresses the displacement amount at points P1 and P2. The vertical axis expresses the height from the under face of the base 91. In the graph, a broken line expresses the change at point P1, and an alternate long and short dash line expresses the change at point P2.

As illustrated in FIGS. 10A and 10B, before the pressure sensitive switch SW is turned on, the first flexible portion 93 is mainly bent. Thus, the positions of points P1 and P2 are both lowered, according to an increase in the displacement amount at point P1. On the other hand, after the pressure sensitive switch SW is turned on, the second flexible portion 94 is mainly bent with the bending of the first flexible portion 93 being roughly maintained. Thus, only the position of point P1 is lowered, according to an increase in the displacement amount at point P1.

In other words, it is revealed that the deformed amount of a part of the pressing member 90 per unit displacement amount in which the under face of the cushion pad is displaced downwardly is greater in a second stage after the pressure sensitive switch SW is turned on than in a first stage before the pressure sensitive switch SW is turned on.

The following is the reason why the pressing member 90 has this deformed amount. Before the pressure sensitive switch SW is turned on, only the first flexible portion 93 roughly acts as a cushion. After the pressure sensitive switch SW is turned on, both of the first flexible portion 93 and the second flexible portion 94 act as a cushion.

Figure 11:
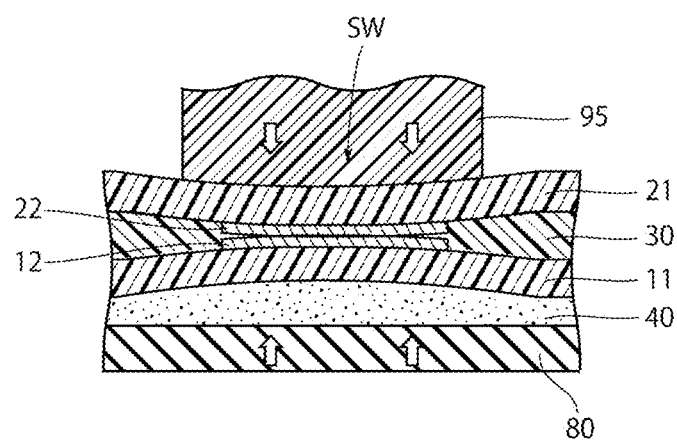
FIG. 11 is a cross sectional view of a pressure sensitive switch being turned on taken along line Y-Y in FIG. 7.

FIG. 11 is a cross sectional view taken along line Y-Y in FIG. 7 illustrating how the pressure sensitive switch SW is turned on. As illustrated in FIG. 11, when a person takes a seat on the cushion pad 60 of the seat device 5 according to the embodiment, a pressure is applied to the pressure sensitive switch SW from both of the pressing member side and the sensor mounting stage side (see arrows).

On the pressing member side, the pad rest 92 of the pressing member 90 presses down the second insulating sheet 21 of the pressure sensitive switch SW.

On the other hand, on the sensor mounting stage, the pressure sensitive switch SW is supported on the support frame 72 through the sensor mounting stage 80. Thus, the position of the pressure sensitive switch SW is not displaced. The sensor mounting stage 80 has rigidity in a degree or more in which the sensor mounting stage 80 is not deformed by a pressure applied to the cushion pad 60 due to a person taking a seat, and thus the sensor mounting stage 80 is not bent. However, the cushion member 40 is attached to the lower side of the first insulating sheet 11 of the pressure sensitive switch SW. Consequently, the cushion member 40 is bent regardless of the degree of the rigidity of the sensor mounting stage 80. Thus, the first insulating sheet 11 is pressed upwardly.

The first and second insulating sheets 11 and 21 pressed in this manner have flexibility, and thus they are bent as though they are entered into the opening 31 of the spacer 30. The first and second insulating sheets 11 and 21 are bent in this manner, and then the first electrode 12 contacts the second electrode 22, which are opposed to each other through the opening 31. Consequently, the pressure sensitive switch SW is turned on.

On the opening 31 of the spacer 30 sandwiched between the first electrode 12 and the second electrode 22, the slit 32 (FIG. 1) is formed to communicate the opening with the outside.

Thus, when the second insulating sheet 21 is bent, air inside the opening 31 is discharged through the slit 32, without air remaining inside the opening. In other words, this avoids the less bending of the first and second insulating sheets 11 and 21 due to air inside the opening 31. Therefore, the first electrode 12 more easily contacts the second electrode 22 than in the case in which the slit 32 is not formed, and thus the sensitivity of the pressure sensitive switch SW can be improved.

As described above, the seat device 5 according to the embodiment includes the support frame 72 having rigidity in a degree or more in which the support frame 72 is not deformed by a pressure applied to the cushion pad 60 due to a person taking a seat. The pressure sensitive switch SW1 is supported through the sensor mounting stage 80 fixed to the support frame 72. Thus, the position of the pressure sensitive switch SW is not displaced regardless of the displacement of the cushion pad 60.

In the case in which an object lighter than a human in weight is placed, the position of the under face of the cushion pad is hardly displaced, whereas in the case in which a person takes a seat, the position is largely displaced downwardly. Blow the cushion pad 60 in which such displacement occurs, the pressure sensitive switch SW is supported with a spacing from the under face of the cushion pad.

Therefore, in the case in which an object is placed on the cushion pad 60, the relative position between the cushion pad 60 and the pressure sensitive switch SW is hardly displaced. Thus, this reduces making a wrong detection by turning on the pressure sensitive switch SW. On the other hand, in the case in which a person takes a seat, the relative position between the cushion pad 60 and the pressure sensitive switch SW is changed, and the pressure sensitive switch SW is turned on. This allows appropriate detection that a person takes a seat.

The seat device 5 according to the embodiment includes the pressing member 90 that is deformed by a pressure applied from the under face of the cushion pad to press the pressure sensitive switch SW. Thus, the pressing member 90 applies repulsion force against pressing force applied from the under face of the cushion pad in response to a person taking a seat to relax pressing force from the cushion pad to the pressure sensitive switch SW.

In addition, the deformed amount of a part of the pressing member 90 per unit displacement amount in which the under face of the cushion pad is displaced downwardly is greater in the second stage after the pressure sensitive switch SW is turned on than in the first stage before the pressure sensitive switch SW is turned on.

Thus, even though the under face of the cushion pad is largely displaced downwardly, the pressing member 90 can make the level of a pressure applied from the under face of the cushion pad to the pressure sensitive switch SW similar in the first stage before the pressure sensitive switch SW is turned on and in the second stage after the pressure sensitive switch SW is turned on.

Therefore, for example, as in the case in which a person more heavily weighted than ordinary people takes a seat, even though an excess pressing force is applied from the cushion pad 60, the pressing force from the cushion pad 60 to the pressure sensitive switch SW can be relaxed. Consequently, the durability of the pressure sensitive switch SW can be improved.

In the case of the embodiment, the base 91 of the pressing member 90 is provided on the face of the pressure sensitive switch SW opposed to the under face of the cushion pad. Thus, the width (the breath) of the pressing member 90 in the horizontal direction can be reduced, compared with the case in which the base 91 is provided on the sensor mounting stage 80. The relative position between the pressure sensitive switch SW can be hardly displaced, compared with the case in which the base 91 is provided on the sensor mounting stage 80. The occurrence of an event is avoided in which the load that has to be applied to the pressure sensitive switch SW is applied to the sensor mounting stage 80 and no load is appropriately applied to the pressure sensitive switch SW, compared with the case in which the base 91 is provided on the sensor mounting stage 80.

(2) Second Embodiment

Next, a second embodiment suitable for the present invention will be described in detail with reference to the drawings. However, in the components of a seat device according to the second embodiment, components the same as or equivalent to the components of the first embodiment are designated the same reference numerals and signs, and the overlapping description will be appropriately omitted.

The seat device according to the embodiment is different from the seat device 5 according to the first embodiment in that a pressing member in a structure different from the pressing member 90 of the first embodiment is provided.

Figure 12:
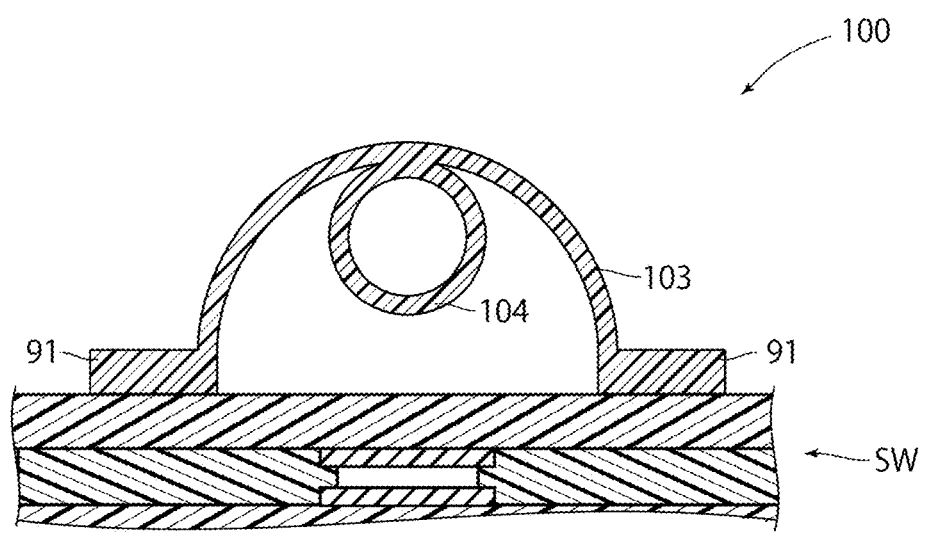
FIG. 12 is a diagram of a pressing member according to a second embodiment, similarly viewed as in FIG. 5.

FIG. 12 is a diagram of a pressing member 100 according to the second embodiment, similarly viewed as in FIG. 5. As illustrated in FIG. 12, similarly to the pressing member 90, the pressing member 100 is an elastic member that is deformed by a pressure applied from the under face of the cushion pad to press the pressure sensitive switch SW. In the case of the embodiment, the pressing member 100 is a rubber member integrally shaped with the base 91, a first flexible portion 103, and a second flexible portion 104.

In the pressing member 100, the pad rest 92 according to the first embodiment is omitted. The shape of the first flexible portion 103 is different from the shape of the first flexible portion 93 according to the first embodiment. The shape of the second flexible portion 104 is different from the shape of the second flexible portion 94 according to the first embodiment.

The first flexible portion 103 is a portion joined to the base 91 to cover the opening opposed to the under face of the cushion pad. The first flexible portion 103 is bent by a pressure applied from the under face of the cushion pad. In the case of the embodiment, the first flexible portion 103 is in a hollow, spherical crown shape extending from the opening edge on one face of the base 91 toward the under face of the cushion pad.

The second flexible portion 104 is a portion provided between the first flexible portion 103 and the pressure sensitive switch SW disposed on the opening of the base 91. The second flexible portion 104 is moved in the direction of the opening in response to the bending of the first flexible portion 103 to press the pressure sensitive switch SW. The second flexible portion 104 is bent after the deformed amount of the first flexible portion 103 exceeds a predetermined amount. The bending amount of the second flexible portion 104 per unit pressure may be the same as or different from the bending amount of the first flexible portion 103 per unit pressure.

In the case of the embodiment, the second flexible portion 104 is in a hollow, spherical shape, which is joined to the inner side at the center of the bending of the first flexible portion 103.

Figure 13A:
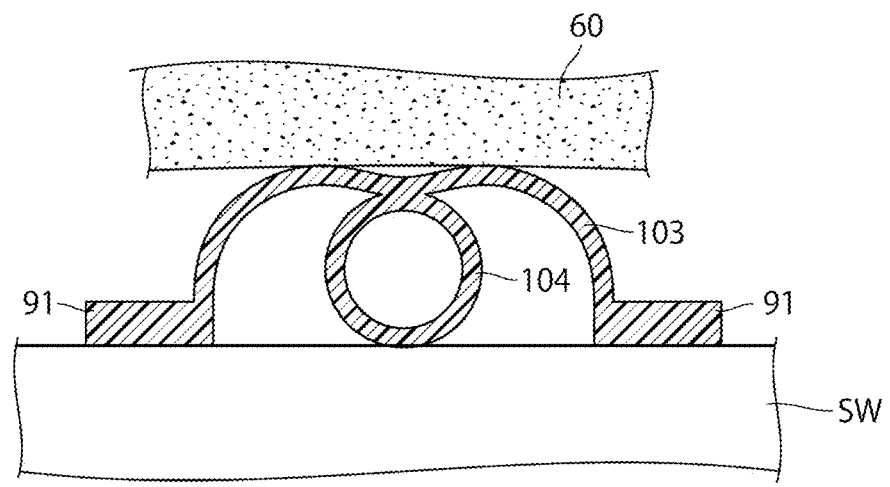
FIGS. 13A and 13B are diagrams each illustrating the pressing member in the case in which a person takes a seat on a seat device, similarly viewed as in FIGS. 9A and 9B.
Figure 13B:
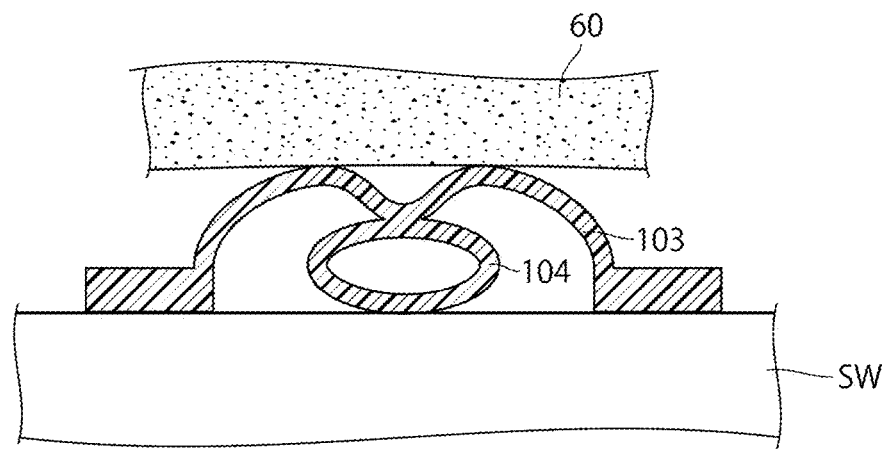

FIGS. 13A and 13B are diagram of the pressing member 100 in the case in which a person takes a seat on the seat device 5, similarly viewed as in FIGS. 9A and 9B. More specifically, FIG. 13A is a diagram of the pressing member 100 in the case in which a light-weight person takes a seat. FIG. 13B is a diagram of the pressing member 100 in the case in which a heavy-weight person takes a seat.

As illustrated in FIGS. 13A and 13B, in the case in which a person takes a seat, the first flexible portion 103 of the pressing member 100 contacts the under face of the cushion pad displaced from the reference position caused by the seating, and then a pressure is applied to the first flexible portion 103.

Here, in the case in which the weight of a person taking a seat is a predetermined threshold or less, as illustrated in FIG. 13A, the first flexible portion 103 is bent by a pressure applied from the cushion pad 60 to press down the second flexible portion 104. The second flexible portion 104 then presses down the pressure sensitive switch SW.

In the pressing, the second flexible portion 104 is hardly bent, and the repulsion force of the first flexible portion 103 relaxes the pressing force from the cushion pad 60 to the pressure sensitive switch SW.

On the other hand, in the case in which the weight of a person taking a seat exceeds a predetermined threshold, as illustrated in FIG. 13B, a larger pressure is applied from the cushion pad 60 to the first flexible portion 103 than in the case in which the weight is the threshold or less. Thus, the first flexible portion 103 is more largely bent to press down the second flexible portion 104, and the second flexible portion 104 presses down the pressure sensitive switch SW.

In the pressing, the second flexible portion 104 is also bent. Consequently, the pressing force from the cushion pad 60 to the pressure sensitive switch SW is relaxed by the repulsion force of the first flexible portion 103 and the repulsion force of the second flexible portion 104.

As described above, similarly to the pressing member 90 of the first embodiment, when the under face of the cushion pad is located below the position of the under face of the cushion pad in turning on the pressure sensitive switch SW, the pressing member 100 has a larger deformed amount than its deformed amount when the pressure sensitive switch SW is turned on.

In other words, the deformed amount of a part of the pressing member 100 per unit displacement amount in which the under face of the cushion pad is displaced downwardly is greater in the second stage after the pressure sensitive switch SW is turned on than in the first stage before the pressure sensitive switch SW is turned on.

Even though the pressing member 100 is provided instead of the pressing member 90 of the first embodiment, the effect similar to the effect of the first embodiment can be obtained. In other words, even though an excess pressing force is applied from the cushion pad 60, the pressing force from the cushion pad 60 to the pressure sensitive switch SW can be relaxed.

(3) Third Embodiment

Next, a third embodiment suitable for the present invention will be described in detail with reference to the drawings. However, in the components of a seat device according to the third embodiment, components the same as or equivalent to the components of the first embodiment are designated the same reference numerals and signs, and the overlapping description will be appropriately omitted.

The seat device according to the embodiment is different from the seat device 5 according to the first embodiment in that a pressing member in a structure different from the pressing member 90 of the first embodiment is provided.

Figure 14:
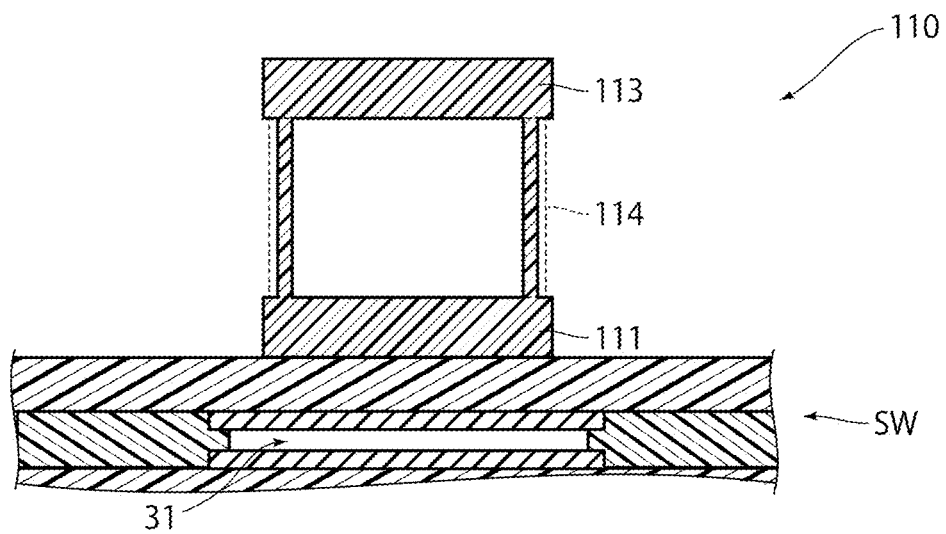
FIG. 14 is a diagram of a pressing member according to a third embodiment, similarly viewed as in FIG. 5.

FIG. 14 is a diagram of a pressing member 110 according to the third embodiment, similarly viewed as in FIG. 5. In FIG. 14, for convenience, the pressure sensitive switch SW is simply illustrated. As illustrated in FIG. 14, similarly to the pressing member 90, the pressing member 110 is an elastic member that is deformed by a pressure applied from the under face of the cushion pad to press the pressure sensitive switch SW. In the case of the embodiment, the pressing member 110 is a rubber member integrally shaped with a base 111, a first flexible portion 113, and a second flexible portion 114.

The base 111 is disposed on the face of the pressure sensitive switch SW opposed to the under face of the cushion pad in a region in which the base 111 overlaps with the opening 31 provided between the switching devices (the first and second electrodes 12 and 22) configuring the pressure sensitive switch SW in the vertical direction. On the base 111, no opening is formed unlike the base 91 according to the first embodiment. In the case of the embodiment, the base 111 is in a rectangular parallelepiped, for example.

The first flexible portion 113 is disposed above the second insulating sheet 21 of the pressure sensitive switch SW with a predetermined spacing. The first flexible portion 113 is bent by a pressure applied from the under face of the cushion pad. The first flexible portion 113 also functions as the pad rest 92 and the first flexible portion 93 according to the first embodiment. In the embodiment, the first flexible portion 113 is in a rectangular parallelepiped, for example.

The second flexible portion 114 is joined to the base 111 and the first flexible portion 113 to support the first flexible portion 113. The second flexible portion 114 is bent after the deformed amount of the first flexible portion 113 exceeds a predetermined amount. The bending amount of the second flexible portion 114 per unit pressure is greater than the bending amount of the first flexible portion 113 per unit pressure.

In the case of the embodiment, the second flexible portion 114 is in a tubular shape. One end of the second flexible portion 114 is joined to the base 111, and the other end of the second flexible portion 114 is joined to the first flexible portion 113.

Figure 15A:
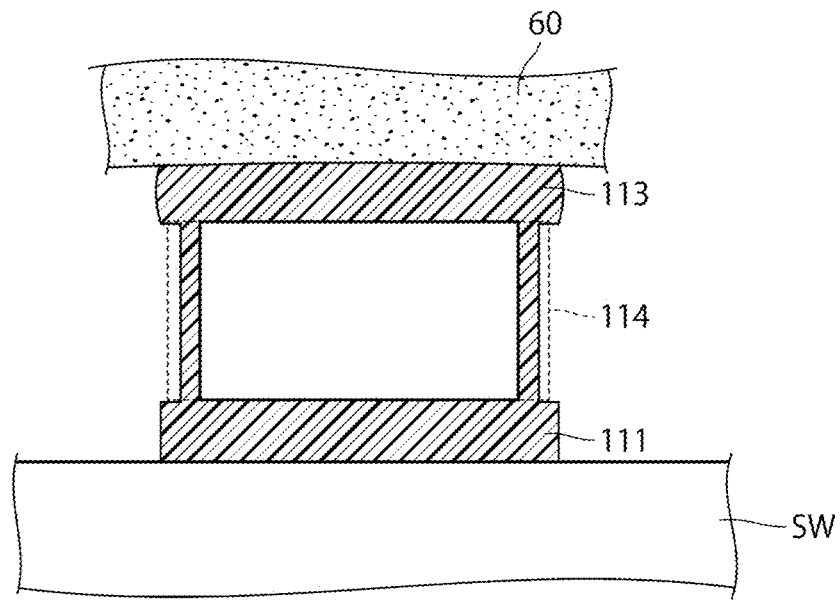
FIGS. 15A and 15B are diagrams each illustrating the pressing member in the case in which a person takes a seat on a seat device, similarly viewed as in FIGS. 9A and 9B.
Figure 15B:
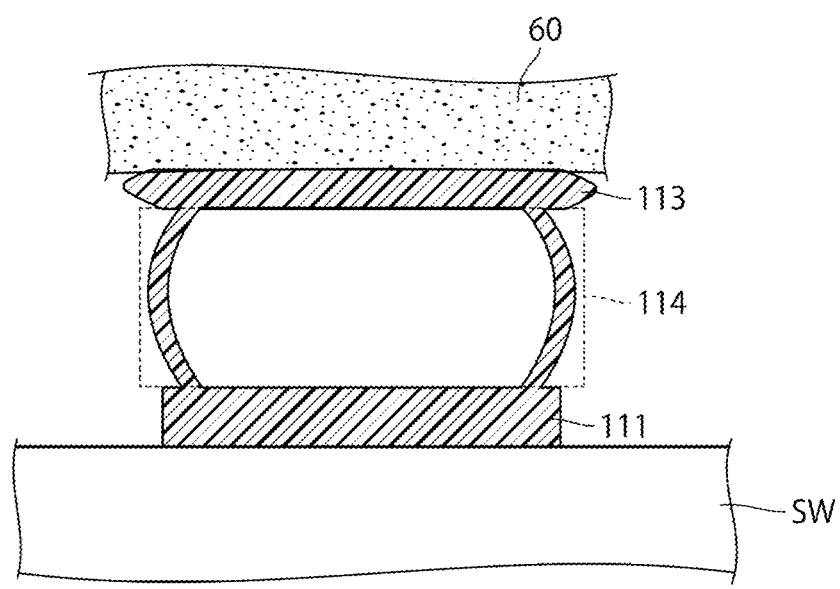

FIGS. 15A and 15B are diagrams of the pressing member 110 in the case in which a person takes a seat on the seat device 5, similarly viewed as in FIGS. 9A and 9B. More specifically, FIG. 15A is a diagram of the pressing member 110 in the case in which a light-weight person takes a seat. FIG. 15B is a diagram of the pressing member 110 in the case in which a heavy-weight person takes a seat.

As illustrated in FIGS. 15A and 15B, in the case in which a person takes a seat, the first flexible portion 113 of the pressing member 110 contacts the under face of the cushion pad displaced from the reference position caused by the seating. Consequently, a pressure is applied to the first flexible portion 113.

Here, in the case in which the weight of a person taking a seat is a predetermined threshold or less, as illustrated in FIG. 15A, the pressure sensitive switch SW is pressed down by a pressure applied from the cushion pad 60 through the first flexible portion 113, the second flexible portion 114, and the base 111.

In the pressing, the first flexible portion 113 is bent. However, the second flexible portion 114, which has the bending amount per unit pressure greater than that of the first flexible portion 113, is hardly bent, and the pressing force from the cushion pad 60 to the pressure sensitive switch SW is relaxed by the repulsion force of the first flexible portion 113. At this time, the base 111 may be bent in some case.

On the other hand, in the case in which the weight of a person taking a seat exceeds a predetermined threshold, as illustrated in FIG. 15B, a larger pressure is applied from the cushion pad 60 to the first flexible portion 103 than in the case in which the weight is the threshold or less.

In the application, the first flexible portion 113 as well as the second flexible portion 114 are bent. Consequently, the pressing force from the cushion pad 60 to the pressure sensitive switch SW is relaxed by the repulsion force of the first flexible portion 113 and the repulsion force of the second flexible portion 114. At this time, the base 111 may be bent in some case.

As described above, similarly to the pressing member 90 of the first embodiment, when the under face of the cushion pad is located below the position of the under face of the cushion pad in turning on the pressure sensitive switch SW, the pressing member 110 has a larger deformed amount than its deformed amount when the pressure sensitive switch SW is turned on.

In other words, the deformed amount of a part of the pressing member 110 per unit displacement amount in which the under face of the cushion pad is displaced downwardly is greater in the second stage after the pressure sensitive switch SW is turned on than in the first stage before the pressure sensitive switch SW is turned on.

Even though the pressing member 110 is provided instead of the pressing member 90 of the first embodiment, the effect similar to the effect of the first embodiment can be obtained. In other words, even though an excess pressing force is applied from the cushion pad 60, the pressing force from the cushion pad 60 to the pressure sensitive switch SW can be relaxed.

(4) Fourth Embodiment

Next, a fourth embodiment suitable for the present invention will be described in detail with reference to the drawings. However, in the components of a seat device according to the fourth embodiment, components the same as or equivalent to the components of the above embodiments are designated the same reference numerals and signs, and the overlapping description will be appropriately omitted.

Figure 16:
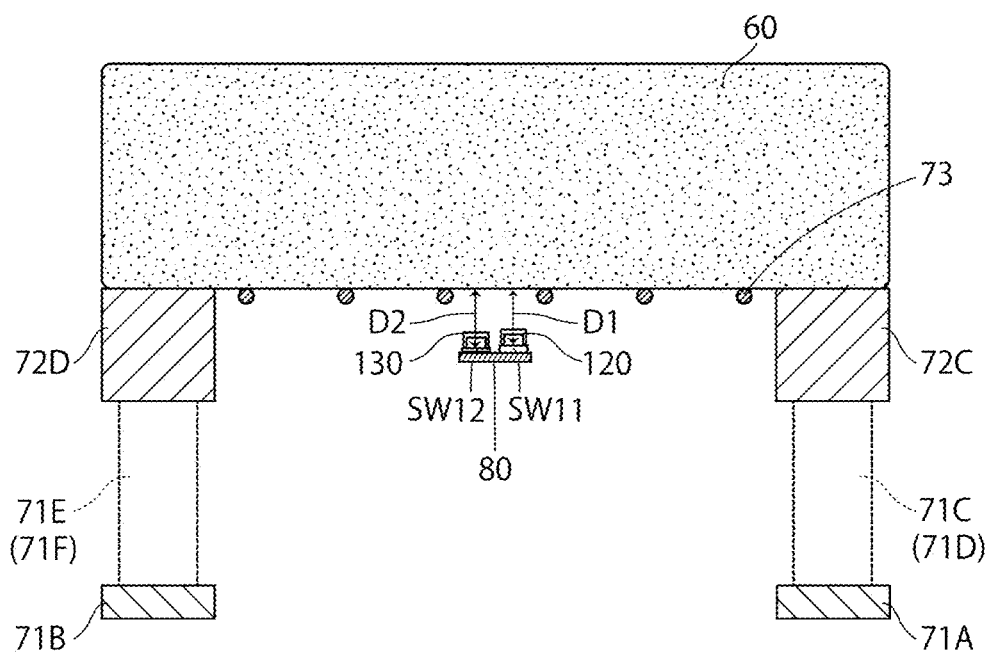
FIG. 16 is a diagram of a seat device according to a fourth embodiment, similarly viewed as in FIG. 4.

FIG. 16 is a diagram of the seat device according to the fourth embodiment, similarly viewed as in FIG. 4. As illustrated in FIG. 16, the seat device according to the embodiment is different from the first embodiment in that two pressure sensitive switches SW11 and SW12 are disposed on the sensor mounting stage 80 according to the first embodiment. In the first embodiment, one pressure sensitive switch SW is disposed on the sensor mounting stage 80.

The first and second pressure sensitive switches SW11 and SW12 are closely disposed in such a manner that similar pressures are applied from the under face of the cushion pad to the first and second pressure sensitive switches SW11 and SW12.

In other words, from the viewpoint of the relationship to a load applied to the under face of the cushion pad, the first and second pressure sensitive switches SW11 and SW12 are disposed below the springs 73 in the vertical direction in a region in which the load difference is 20% or less from a load to a portion on which attention is focused on the under face of the cushion pad.

From the viewpoint of the relationship to the adjacent springs 73, the first and second pressure sensitive switches SW11 and SW12 are disposed side by side between the springs 73 in no contact with each other on a straight line orthogonal to the center axes of the springs 73. From the viewpoint of the relationship to the opening 31 of the pressure sensitive switch (FIGS. 2A and 2B), the first and second pressure sensitive switches SW11 and SW12 are disposed with a spacing having a value five times the diameter of the opening 31.

A shortest distance D1 from the under face of the cushion pad to the first pressure sensitive switch SW11 is shorter than a shortest distance D2 from the under face of the cushion pad to the second pressure sensitive switch SW12.

In other words, the shortest distance D1 or D2 is a straight distance from the under face of the cushion pad to the first pressure sensitive switch SW11 or to the second pressure sensitive switch SW12 in the vertical direction of the under face of the cushion pad.

Figure 17A:
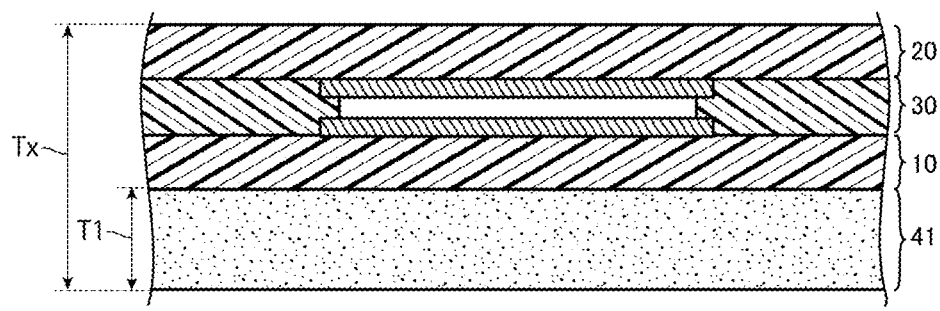
FIGS. 17A and 17B are cross sectional views of a first pressure sensitive switch and a second pressure sensitive switch, similarly viewed as in FIG. 2B.
Figure 17B:
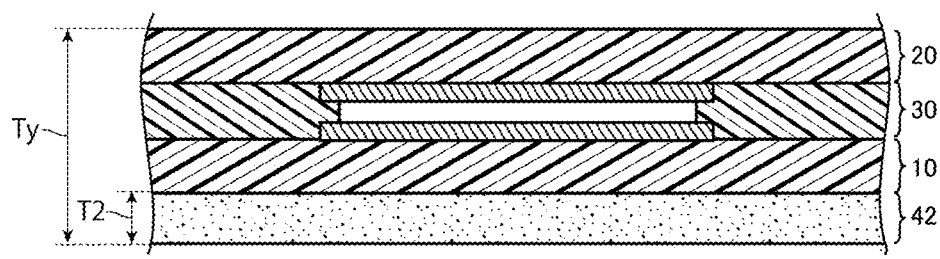

FIGS. 17A and 17B are cross sectional view of the first and second pressure sensitive switches SW11 and SW12, similarly viewed as in FIG. 2B. More specifically, FIG. 17A is a cross section of the first pressure sensitive switch SW11. FIG. 17B is a cross section of the second pressure sensitive switch SW12.

As illustrated in FIGS. 17A and 17B, a thickness T1 of a cushion member 41 configuring the first pressure sensitive switch SW11 is greater than a thickness T2 of a cushion member 42 configuring the second pressure sensitive switch SW12. With this relationship, the above-described shortest distance D1 is shorter than the shortest distance D2.

In the case in which the sensitivity of the first pressure sensitive switch SW11 is substantially different from the sensitivity of the second pressure sensitive switch SW12 caused by the difference in the thicknesses of the cushion members 41 and 42, for example, the hardness of the cushion member 41 or 42 is appropriately adjusted.

The sensitivity is a degree of detecting a pressure. The sensitivity expresses a degree of ease of contact between one of the switching devices (in the embodiment, the first electrode 12) and the other of the switching devices (in the embodiment, the second electrode 22), which form the switch.

The seat device according to the embodiment is different from the first embodiment in that two pressing members 120 and 130 (FIG. 16) are disposed on the sensor mounting stage 80 according to the first embodiment. In the first embodiment, one pressing member 90 is disposed on the sensor mounting stage 80.

The first and second pressing members 120 and 130 have the same structure as the structure of the pressing member 90, 100, or 110 according to the above embodiments. In FIG. 16, for convenience, the first and second pressing members 120 and 130 are simply illustrated.

As described above, in the seat device according to the embodiment, the first and second pressure sensitive switches SW11 and SW12 are supported on the support frame 72, which is not moved together with the cushion pad being displaced due to a person taking a seat, through the sensor mounting stage 80. Thus, even though the cushion pad 60 is displaced, the positions of the first and second pressure sensitive switches SW11 and SW12 are not displaced.

On the other hand, in the case in which the weight of a person, for example, is applied from the seat face to the cushion pad 60, the under face of the cushion pad and the bottom of the spring are displaced in such a manner that they fall overall. The positions are below the positions when no person takes a seat. The displacement amount is greatly different between the case in which a person takes a seat and the case in which an object lighter than a human in weight is placed.

In other words, in the case in which a person takes a seat, the cushion pad 60 is overall largely displaced downwardly, and the relative position to the first and second pressure sensitive switches SW11 and SW12 is changed. In this case, the cushion pad 60 presses the first pressure sensitive switch SW11 through the first pressing member 120, and then the first pressure sensitive switch SW11 is turned on. The cushion pad 60 presses the second pressure sensitive switch SW12 through the second pressing member 130, and then the second pressure sensitive switch SW12 is turned on.

In contrast to this, in the case in which an object is placed on the cushion pad 60, the cushion pad 60 is hardly displaced, and the amount of changes in the relative position to the first and second pressure sensitive switches SW11 and SW12 is small. Consequently, making a wrong detection, which is caused by turning on the first and second pressure sensitive switches SW11 and SW12 being turned on, is reduced. Therefore, a person can be distinguished from an object.

In the seat device according to the embodiment, the first and second pressure sensitive switches SW11 and SW12 are disposed closely to each other below the cushion pad with a spacing from the under face of the cushion pad. The shortest distance D1 is shorter than the shortest distance D2.

Thus, the difference in weights applied to the cushion pad 60 can be obtained in two patterns, i.e., the case in which only the first pressure sensitive switch SW11 is turned on, and the case in which both of the first and second pressure sensitive switches SW11 and SW12 are turned on. Therefore, persons in different weights can be distinguished from each other.

(5) Fifth Embodiment

Next, a fifth embodiment suitable for the present invention will be described in detail with reference to the drawings. However, in the components of a seat device according to the fifth embodiment, components the same as or equivalent to the components of the first embodiment are designated the same reference numerals and signs, and the overlapping description will be appropriately omitted.

Figure 18:
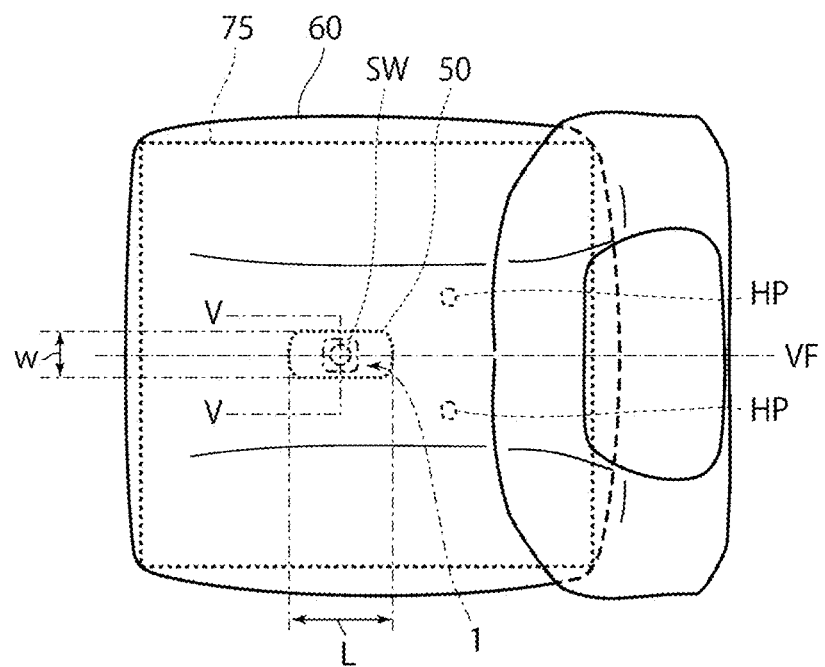
FIG. 18 is a diagram of a seat device according to a fifth embodiment viewed from above.

FIG. 18 is a diagram of the seat device according to the fifth embodiment viewed from above. As illustrated in FIG. 18, the seat device according to the embodiment is different from the first embodiment in that a seat pan 75 is provided instead of the cushion mounting unit 70 according to the first embodiment.

The seat pan 75 is a support member for supporting the cushion pad 60. The seat pan 75 has rigidity in a degree or more in which the seat pan 75 is not deformed by a pressure applied to the cushion pad 60 due to a person taking a seat. For example, the material of the seat pan 75 can be a metal or ceramics.

The seat device according to the embodiment is different from the first embodiment in that a groove recess 50 is formed on the under face of the cushion pad 60 according to the first embodiment. The recess 50 is extended in the longitudinal direction of the cushion pad 60.

The width of the recess 50 is defined as W, which is the length in the direction parallel with the lateral direction of the cushion pad 60, and the length of the recess 50 is defined as L, which is the length in the direction parallel with in the longitudinal direction of the cushion pad 60. In this case, supposing that the width W is one, the ratio of the length L to the width W is two or more. In the case of the embodiment, in the width W of the recess 50, two electrodes configuring the pressure sensitive switch are not arranged in the crosswise direction of the recess 50. In the length L of the recess 50, two or more electrodes configuring the pressure sensitive switch can be arranged in the longitudinal direction of the recess 50. More specifically, the width W of the recess 50 is about 45 mm, for example. The length L of the recess 50 is about 140 mm, for example.

The recess 50 is formed on the front side of the hip points HP in bilateral symmetry relative to a vertical plane VF passing the center of the cushion pad 60 in the lateral direction, for example.

Figure 19:
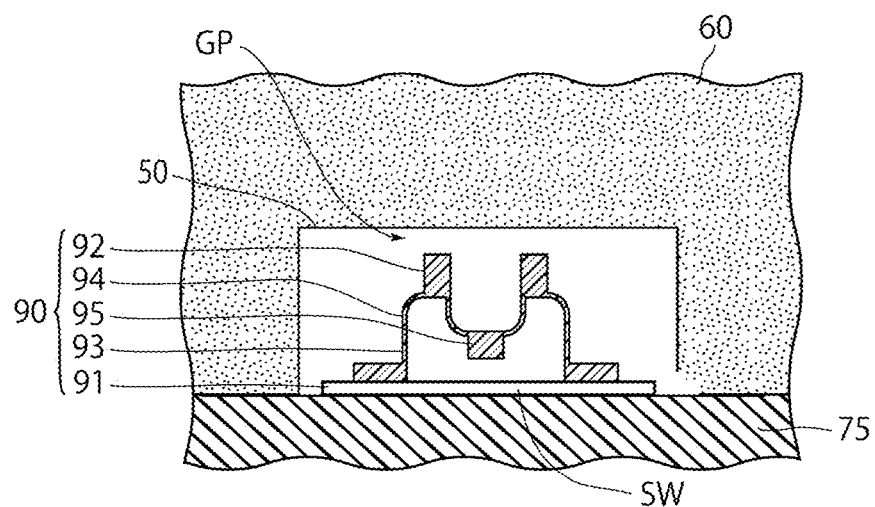
FIG. 19 is a cross sectional view taken along line V-V in FIG. 18.

FIG. 19 is a cross sectional view taken along line V-V in FIG. 18. In FIG. 19, for easy understanding, the cross section of the pressure sensitive switch SW is not illustrated. As illustrated in FIG. 19, in the seat device according to the embodiment, the pressure sensitive switch SW and the pressing member 90 are placed on the mounting face of the seat pan 75. On the mounting face of the seat pan 75, the cushion pad 60 is placed in such a manner that the pressure sensitive switch SW and the pressing member 90 are accommodated in the recess 50. In the embodiment, a gap GP is formed between the pad rest 92 of the pressing member 90 and the recess 50.

In the seat device according to the embodiment, in the case in which a pressure is applied from the seat face side to the cushion pad 60, the recess 50 on the under face of the cushion pad 60 is bent, and then the pressure sensitive switch SW is turned on through the pressing member 90.

In the case in which the recess 50 is not formed, the pressure spread from the seating portion of the cushion pad in the longitudinal direction is dispersed, and the pressure is hardly spread in the longitudinal direction. However, in the seat device according to the embodiment, even though a different cushion pad 60 is used and a belt-shaped pressure spread in the lateral direction of the cushion pad 60 is displaced in the longitudinal direction, the pressure is applied to any one part of the recess 50. With the application of the pressure to any one part of the recess 50, the pressure is spread along the recess 50 overall from the applied point. Consequently, the recess 50 is bent. In other words, the pressure is concentrated along the recess 50.

Therefore, in the case of the seat device according to the embodiment, even though a different cushion pad 60 is used, the entire recess 50 is bent to cause the pressing member 90 to apply pressing force, which is similar to pressing force when the seating portion is on the seat face portion, to the pressure sensitive switch SW, which is disposed on the space of the recess 50 extended in the longitudinal direction of the cushion pad 60. In other words, the recess 50 extended in the longitudinal direction of the cushion pad 60 functions as a simple accommodating space as well as acts on the pressure sensitive switch SW through the pressing member 90 for concentrating pressing force. Thus, with no use of a special pressure sensitive switch in a different configuration, or with the use of one pressure sensitive switch, the sensitivity of the pressure sensitive switch can be improved.

The pressure spread in the lateral direction of the cushion pad 60 is spread to both ends of the cushion pad on the lower side regardless of the presence or absence of the groove. Thus, even though a groove extending in the lateral direction of the cushion pad 60 is formed on the under face of the cushion pad 60 instead of the recess 50, this groove does not act on the pressure sensitive switch SW for concentrating pressing force.

In the case of the embodiment, the gap GP is formed between the first flexible portion 93 of the pressing member 90 and the recess 50.

Thus, making a wrong detection can be reduced, compared with the case in which no gap GP is provided. For example, in the case in which an object lighter than a person in weight is placed, the pressure sensitive switch SW is turned on by a pressure applied to the cushion pad 60. This is an example of a wrong detection. In the case of the embodiment, the pressure sensitive switch SW and the pressing member 90 are disposed inside the recess 50 on which a pressure applied to the cushion pad 60 is concentrated. Thus, the provision of the gap GP is specifically useful. Adjusting the size of the gap GP can also control the sensitivity in such a manner that the pressure sensitive switch SW is turned on by a pressure applied to the cushion pad 60 when a person takes a seat.

In the embodiment, the pressing member 90 according to the first embodiment is applied. Instead of the pressing member 90, the pressing member 100 according to the second embodiment or the pressing member 110 according to the third embodiment may be applied.

In the embodiment, the pressure sensitive switch SW and the pressing member 90 according to the first embodiment are applied. However, instead of the pressure sensitive switch SW and the pressing member 90, the pressure sensitive switches SW11 and SW12 and the pressing members 120 and 130 according to the fourth embodiment may be applied.

In the case in which the pressure sensitive switches SW11 and SW12 and the pressing members 120 and 130 are applied, the pressure sensitive switches SW11 and SW12 and the pressing members 120 and 130 may be accommodated in one recess 50. Alternatively, the pressure sensitive switch SW11 and the pressing member 120 may be accommodated in a first recess 50, and the pressure sensitive switch SW12 and the pressing member 130 may be accommodated in another recess 50.

(6) Other Embodiments

As described above, the first to fifth embodiments are described as examples. However, the present invention is not limited to the first to fifth embodiments.

For example, in the above embodiments, the pressing member 90, 100 or 110 in different structures is applied. However, any pressing members in any structures are applicable other than the structures according to the embodiment. These pressing members are deformed by a pressure applied from the under face of the cushion pad to press the pressure sensitive switch. In the pressing members, the deformed amount of a part of the pressing members per unit displacement amount in which the under face of the cushion pad is displaced downwardly is greater in the second stage after the pressure sensitive switch SW is turned on than in the first stage before the pressure sensitive switch SW is turned on.

For example, in the above first and second embodiments, the pressing member 90 or 100 is applied, in which the first flexible portion 93 or 103 is joined to the base 91. However, as in the third embodiment, such a pressing member may be applied, in which the second flexible portion is joined to the base. Alternatively, in the above third embodiment, the pressing member 110 is applied, in which the second flexible portion 114 is joined to the base 111. However, as in the first embodiment or the second embodiment, such a pressing member may be applied, in which the first flexible portion is joined to the base. In short, the base is joined to the first flexible portion or the second flexible portion.

In the above fourth embodiment, the thickness of the cushion member 41 configuring the first pressure sensitive switch SW11 is greater than the thickness of the cushion member 42 configuring the second pressure sensitive switch SW12. Thus, the shortest distance D1 is shorter than the shortest distance D2.

However, other than varying the thicknesses of the cushion members 41 and 42 from each other, any methods are applicable to a method of shortening the shortest distance D1 shorter than the shortest distance D2. For example, instead of the cushion member 41 and 42 or in addition to the cushion member 41 and 42, the thickness of any one of the first insulating sheet 11, the second insulating sheet 21, the first electrode 12, the second electrode 22, and the spacer 30, or their thicknesses may be greater in the first pressure sensitive switch SW11 than in the second pressure sensitive switch SW12. In other words, a thickness Tx of the first pressure sensitive switch SW11 (FIG. 17A) only has to be greater than a thickness Ty of the second pressure sensitive switch SW12 (FIG. 17B).

The shortest distance D1 may be shorter than the shortest distance D2 in such a manner that projections and depressions are formed on the top face of the sensor mounting stage 80 and the face on which the first pressure sensitive switch SW11 is disposed is lower than the face on which the second pressure sensitive switch SW12 is disposed in the first and second pressure sensitive switches SW11 and SW12 in the same thickness.

In the above fourth embodiment, the shortest distance D1 from the under face of the cushion pad to the first pressure sensitive switch SW11 is shorter than the shortest distance D2 from the under face of the cushion pad to the second pressure sensitive switch SW12.

However, instead of or in addition to the shortest distance D1 being shorter than the shortest distance D2, the shortest distance from the under face of the cushion pad to the first pressing member 120 may be shorter than the shortest distance from the under face of the cushion pad to the second pressing member 130.

A method of shortening the shortest distance from the under face of the cushion pad to the first pressing member 120 shorter than the shortest distance from the under face of the cushion pad to the second pressing member 130 is similar to the method of shortening the shortest distance D1 shorter than the shortest distance D2.

In other words, there is a method in which the height of any one of the base, the pad rest, the first flexible portion, or the second flexible portion configuring the pressing member from the sensor mounting stage 80 or their heights from the sensor mounting stage 80 is higher in the first pressing member 120 than in the second pressing member 130.

There is another method. In the method, projections and depressions are formed on the top face of the sensor mounting stage 80. The first pressure sensitive switch and the second pressure sensitive switch in the same structure and the first pressing member and the second pressing member in the same structure are prepared. The face on which the first pressure sensitive switch and the first pressing member are disposed is lowered than the face on which the second pressure sensitive switch and the second pressing member are disposed.

In the above fourth embodiment, the first and second pressure sensitive switches SW11 and SW12 have similar sensitivity. The shortest distance D1 is shorter than the shortest distance D2.

However, the sensitivity of the first pressure sensitive switch SW11 may be higher than the sensitivity of the second pressure sensitive switch SW12. The shortest distances from the under face of the cushion pad to the pressure sensitive switches SW11 and SW12 may be the same.

For a method of increasing the sensitivity of the first pressure sensitive switch SW11 more than the sensitivity of the second pressure sensitive switch SW12, for example, the opening 31 of the first pressure sensitive switch SW11 is greater than the opening 31 of the second pressure sensitive switch SW12. Alternatively, the hardness of the first insulating sheet 11, the second insulating sheet 21, the first electrode 12, the second electrode 22, or the spacer 30 is smaller in the first pressure sensitive switch SW11 than in the second pressure sensitive switch SW12.

It may be possible that the slit 32 formed on the opening 31 of the first pressure sensitive switch SW11 is unchanged and the slit 32 formed on the opening 31 of the second pressure sensitive switch SW12 is omitted. In this case, in the opening 31 of the second pressure sensitive switch SW12, air in the opening is not discharged and is left in the opening to prevent the first and second insulating sheets 11 and 21 from being bent. Consequently, the sensitivity of the first pressure sensitive switch SW11 is higher than the sensitivity of the second pressure sensitive switch SW12. Therefore, even though the opening 31 is wrongly varied in size, for example, in manufacture of the opening 31, the sensitivity of the first pressure sensitive switch SW11 can be easily made different from the sensitivity of the second pressure sensitive switch SW12.

Instead of or in addition to the sensitivity of the first pressure sensitive switch SW11 being higher than the sensitivity of the second pressure sensitive switch SW12, it may be possible that the deformed amount of the first pressing member 120 per unit pressure is greater than the deformed amount of the second pressing member 130 per unit pressure.

For a method of varying the deformed amounts of the first and second pressing members 120 and 130, for example, the rigidity of the base, the pad rest, the first flexible portion, or the second flexible portion configuring the pressing member or the rigidity of them is smaller in the first pressing member 120 than in the second pressing member 130.

In short, the first and second pressing members 120 and 130 only have to be in the relationship in which the first pressure sensitive switch is turned on through the first pressing member when a first weight or greater is applied from the seat face of the cushion pad 60 side, and the second pressure sensitive switch is turned on through the second pressing member when a second weight that is greater than the first weight or greater is applied from the seat face of the cushion pad 60 side.

In the above fourth embodiment, no member is provided between the first and second pressing members 120 and 130 and the cushion pad opposed to the pressing members.

However, preferably, a reinforcing member moved together with the cushion pad 60 being displaced is provided between the first and second pressing members 120 and 130 and the cushion pad opposed to the pressing members.

Figure 20:
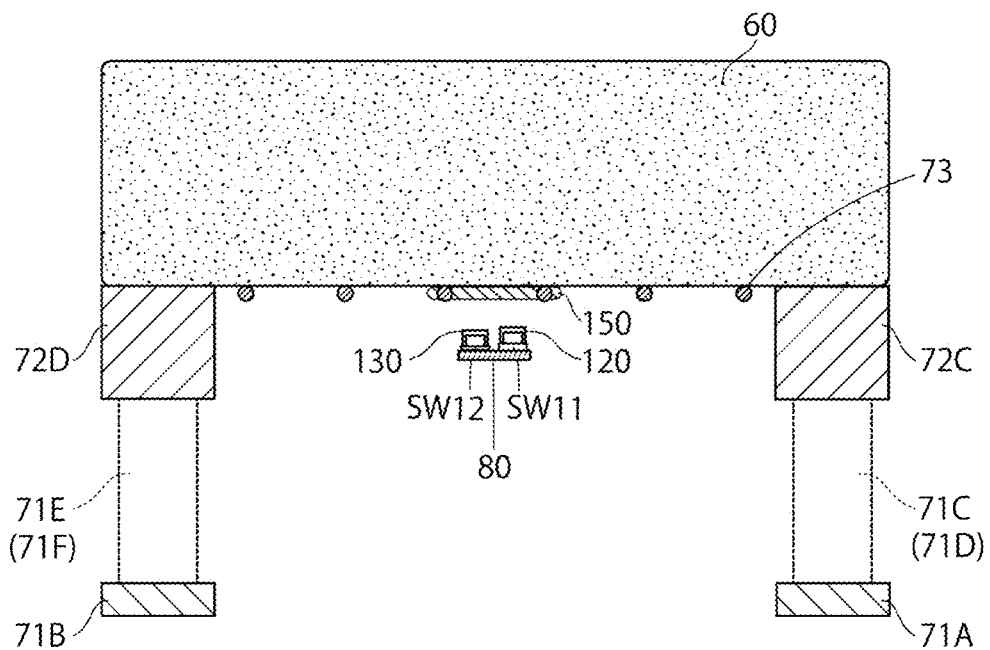
FIG. 20 is a diagram of a seat device including a reinforcing member.

More specifically, for example, FIG. 20 is an example of this form. In this example, a plate-shaped reinforcing member 150 is disposed on the underside of the cushion pad opposed to the pressing members between the adjacent springs 73 above the first and second pressing members 120 and 130. One end of the reinforcing member 150 is fixed to one of the adjacent springs 73, and the other end of the reinforcing member 150 is fixed to the other of the adjacent springs 73.

In the case in which the reinforcing member 150 is provided, even though the degradation of the cushion pad 60 over time causes the under face of the cushion pad to fall downwardly, the reinforcing member 150 can prevent the under face of the cushion pad opposed to the reinforcing member 150 from falling below the reinforcing member 150. Therefore, it is possible to reduce the degradation of the accuracy of distinguishing between a person and an object or between persons in different weights caused by the under face of the cushion pad falling downwardly. In addition to this, even though the under face of the cushion pad has projections and depressions, it is possible to reduce the degradation of the accuracy of distinguishing between a person and an object or between persons in different weights caused by the projections and depressions.

Instead of the reinforcing member 150, for example, a thin film reinforcing member may be applied, which is attached to the cushion pad opposed to the first and second pressing members 120 and 130. However, from the viewpoint of preventing the under face of the cushion pad from falling downwardly below the springs 73, the above reinforcing member 150 is preferably applied, compared with the case in which a thin film reinforcing member is attached.

The material of the reinforcing member only has to be materials having rigidity higher than the rigidity of the cushion pad 60. Materials having rigidity higher than the rigidity of the cushion pad 60 are more preferable. More specifically, materials are metals and resins, for example. The above reinforcing member is also applicable to the first to third embodiments and the fifth embodiment.

In the above first to fourth embodiments, the pressure sensitive switch is supported on the support frame 72, which is a component of the support member supporting the cushion pad 60, through the sensor mounting stage 80. In the above fifth embodiment, the pressure sensitive switch is placed on the mounting face of the seat pan 75, which is a support member supporting the cushion pad 60, and the pressure sensitive switch is directly supported on the seat pan 75.

However, any forms that can support the pressure sensitive switch are possible, not limited to the above embodiments. For example, the pressure sensitive switch may be supported on the stand 71 through the sensor mounting stage 80. The pressure sensitive switch may be supported on members other than the stand 71 or the support frame 72. A form may be possible in which a frame is shaped integrally with the stand 71 or the support frame 72 and the sensor mounting stage 80, and the seat sensor is placed on the frame. Thus, the pressure sensitive switch is directly supported, not through the sensor mounting stage. In short, the pressure sensitive switch can be supported on the member that is not moved together with the cushion pad 60 being displaced, which is caused by a person taking a seat. In the case in which the stand 71 or the support frame 72 and the sensor mounting stage 80 are integrally shaped each other, displacement caused by vibrations is avoided, compared with the case in which the components are not integrally shaped with each other. Thus, it is possible to more appropriately detect whether a parson takes a seat.

It is also possible that the sensor mounting stage is mounted on a part of the plurality of springs 73 extended on the opening of the support frame 72 and the pressure sensitive switch SW is disposed on the sensor mounting stage with a spacing from the under face of the cushion pad.

Figure 21:
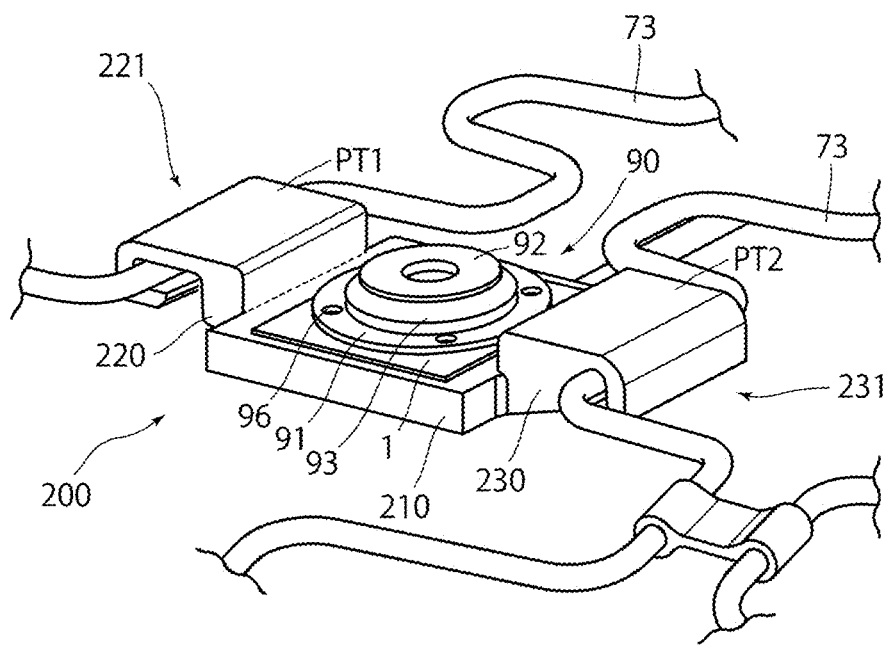
FIG. 21 is a diagram of the disposition of a pressing member according to another embodiment.

For example, FIG. 21 is an example of this form. In this example, a sensor mounting stage 200 is mounted on across a part of the two adjacent springs 73. On the sensor mounting stage 200, the seat sensor 1 is placed as the cushion member 40 of the seat sensor 1 faces the lower side. As described later, the cushion member 40 does not necessarily have to be provided.

On the front surface of the second insulating sheet 21 on the opposite side of the first insulating sheet 11 configuring the pressure sensitive switch SW of the seat sensor 1, the pressing member 90 is disposed. The pressing member 90 is deformed by a pressure applied from the under face of the cushion pad to press the pressure sensitive switch SW of the seat sensor 1.

The sensor mounting stage 200 includes a base 210 placed on the seat sensor 1, a first arm 220 joined at a predetermined position of the base 210, and a second arm 230 joined to the base 210 as opposed to the first arm 220.

At the tip end portion of the first arm 220, a fitting portion 221 is formed. The fitting portion 221 is detachable from the spring 73 in the horizontal direction. On the other hand, at the tip end portion of the second arm 230, a fitting portion 231 is formed. The fitting portion 231 is detachable from the spring 73 in the vertical direction.

In the case in which the sensor mounting stage 200 is mounted on a part of the plurality of springs 73, the sensor mounting stage 200 can be roughly positioned by fitting the fitting portion 221 in such a manner that the fitting portion 221 is caught on a first spring. Thus, the fitting portion 231 is simply pressed against and fit into a second spring opposed to the first spring, and the sensor mounting stage 200 can be easily mounted on a part of the plurality of springs 73.

The fitting portion 221 of the first arm 220 is orthogonal to the fitting portion 231 of the second arm 230 in the fitting direction. Thus, even though the plurality of springs 73 vertically or laterally vibrates, the sensor mounting stage 200 mounted on a part of the springs 73 can be prevented from being detached from the spring 73.

The first arm 220 has an upper end portion PT1 opposed to the under face of the cushion pad. The second arm 230 has an upper end portion PT2 opposed to the under face of the cushion pad. The upper end portions PT1 and PT2 are formed flat on the same side. Therefore, the first arm 220 and the second arm 230 can reduce damage on the cushion pad 60, for example, when the cushion pad 60 is pressed.

The mounting face of the base 210 is lower than the upper end portion PT1 of the first arm 220 and the upper end portion PT2 of the second arm 230, and steps are formed from the mounting face of the base 210 to the upper end portions PT1 and PT2. The upper end portions PT1 and PT2 are positioned higher than the mounting face of the base 210. In other words, the pressure sensitive switch SW is disposed in such a manner that the top face of the second insulating sheet 21 of the pressure sensitive switch SW is located below the portions PT1 and PT2 of the sensor mounting stage 200. The portions PT1 and PT2 are nearest to the under face of the cushion pad. The top face of the second insulating sheet 21 is nearest to the under face of the cushion pad.

Thus, in the case in which the degradation of the cushion pad 60 over time causes the under face of the cushion pad to fall downwardly, the under face of the cushion pad is supported on the sensor mounting stage 200. Therefore, in the case in which the under face of the cushion pad falls downwardly, it is possible to reduce the occurrence of an event in which the pressure sensitive switch SW is continuously on. The portion of the pressure sensitive switch SW nearest to the under face of the cushion pad is located below the portions PT1 and PT2 of the sensor mounting stage 200 nearest to the under face of the cushion pad. In the case in which a load is applied, the under face of the cushion pad is first supported on the sensor mounting stage 200. The relative position between the cushion pad 60 and the pressure sensitive switch SW is hardly displaced. After that, a load is further applied, and then the pressure sensitive switch SW is turned on. Thus, making a wrong detection, which is caused by the pressure sensitive switch SW being turned on, is reduced. Consequently, the accuracy of distinguishing between a person and an object is improved.

The upper end portion PT1 of the first arm 220 and the upper end portion PT2 of the second arm 230 are positioned higher than the upper end portion of the pressing member 90 disposed on the seat sensor 1. In other words, the pressing member 90 is disposed in such a manner that the top face of the pad rest 92 of the pressing member 90 nearest to the under face of the cushion pad is located lower than the portions PT1 and PT2 of the sensor mounting stage 200 nearest to the under face of the cushion pad.

Consequently, in the case in which the under face of the cushion pad falls downwardly, it is possible to further reduce the occurrence of an event in which the pressure sensitive switch SW is continuously on. The accuracy of distinguishing between a person and an object is further improved.

In FIG. 21, the pressing member 90 of the first embodiment is applied. However, instead of the pressing member 90, the pressing member 100 according to the second embodiment or the pressing member 110 according to the third embodiment may be applied.

In FIG. 21, a through hole 96 is provided on the base 91 of the pressing member 90 for screwing the pressing member 90 and the seat sensor 1 to the sensor mounting stage 200. The through hole 96 may be omitted. In the case in which the through hole 96 is omitted, an adhesive, for example, is used to fix the seat sensor 1 to the sensor mounting stage 200, and then the pressing member 90 is fixed to the seat sensor 1.

In FIG. 21, the sensor mounting stage 200 is mounted on across a part of two adjacent springs 73. The sensor mounting stage 200 may be mounted on across three or more springs 73. The sensor mounting stage 200 may be mounted on a part of one spring 73. In the case in which the sensor mounting stage 200 is mounted on a part of one spring 73, for example, a nonlinear groove, into which the bent portion of one spring 73 can be fit, only has to be provided on the back face of the sensor mounting stage 200, instead of the first arm 220 and the second arm 230.

It may be possible that a first pressure sensitive switch is disposed on the sensor mounting stage 200 mounted on a part of a spring 73 and a second pressure sensitive switch is disposed on the sensor mounting stage 200 mounted on another part of the spring 73. In this case, the accuracy of distinguishing between persons in different weights can be improved.

Figure 22:
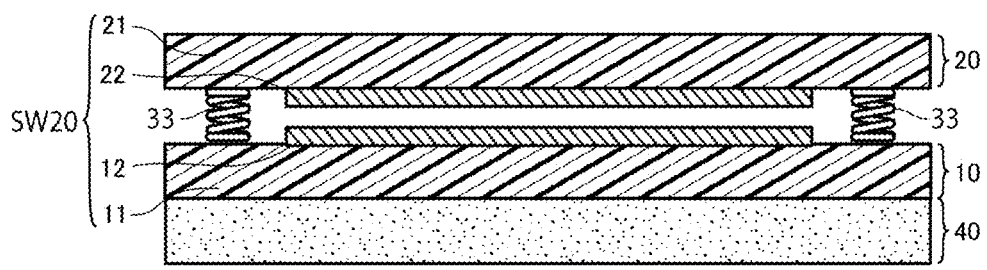
FIG. 22 is a diagram of the configuration of a pressure sensitive switch according to still another embodiment.

In the above embodiments, the pressure sensitive switch SW, SW11, or SW12 is applied, which is configured of a pair of the electrode sheets 10 and 20 and the spacer 30. For example, a pressure sensitive switch SW20 illustrated in FIG. 22 may be applied. In FIG. 22, for convenience, springs 33 are not illustrated in a cross section.

The pressure sensitive switch SW20 illustrated in FIG. 22 is different from the above-described pressure sensitive switch SW, SW11, or SW12 only in that the spacer 30 of the pressure sensitive switch SW, SW11, or SW12 is replaced by a plurality of springs 33. For example, the springs 33 are disposed as opposed to each other with the pressure sensitive switch SW1 being between them. The top end of the spring is fixed to the second insulating sheet 11. The lower end of the spring is fixed to the first insulating sheet 11. Even though this pressure sensitive switch is applied, the effect similar to the effect of the above embodiments is exerted. Any pressure sensitive switches in any configurations other than the pressure sensitive switch SW20 may be applied.

In the above embodiments, the pressure sensitive switch and the pressing member are disposed below the bottom of the spring. However, the pressure sensitive switch and the pressing member do not necessarily have to be disposed below the bottom of the spring, when the pressure sensitive switch and the pressing member are disposed below the cushion pad 60 with a spacing from the under face of the cushion pad.

In the above embodiments, one pressure sensitive switch is provided on the seat sensor 1. However, two or more pressure sensitive switches may be provided.

In the above embodiments, the first insulating sheet 11 of the first electrode sheet 10 configuring the pressure sensitive switch SW and the second insulating sheet 21 of the second electrode sheet 20 configuring the pressure sensitive switch SW are flexible film insulating sheets. However, at least one of the first and second insulating sheets 11 and 21 may be a metal plate. In this case, at least one of the first electrode 12 of the first electrode sheet 10 and the second electrode 22 of the second electrode sheet 20 can be omitted. However, the first electrode 12 or the second electrode 22 does not necessarily have to be omitted.

In the above embodiments, the cushion member 40 is attached to the under face of the first insulating sheet 11. However, the cushion member 40 may be omitted. In the case in which the cushion member 40 is omitted, the thickness of the pressure sensitive switch SW, SW11, or SW12 can be reduced accordingly. Even though the cushion member 40 is omitted, a pressure is applied to the upper side of the pressure sensitive switch SW, SW11, or SW12 through the pressing member. Thus, even though the cushion member 40 is omitted, the pressure sensitive switch SW, SW11, or SW12 is turned on.

Figure 23:
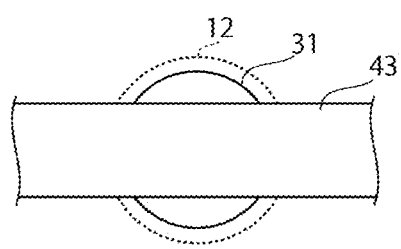
FIG. 23 is a diagram of the relationship between the opening of a spacer and a cushion member.

In the above embodiments, the cushion member 40 is applied. The cushion member 40 entirely covers the opening 31 of the spacer 30 through the first insulating sheet 11. For example, as illustrated in FIG. 23, a cushion member 43 may be applied. The cushion member 43 covers a part of the opening 31. In the case in which this cushion member 43 is applied, the ratio of the cushion member 43 covering the opening (the amount of the cushion member covering the opening) is adjusted, and thus the sensitivity of the pressure sensitive switch SW, SW11, or SW12 can be adjusted. In the case in which two or more pressure sensitive switches are provided, the amounts of the cushion members 43 covering the openings of these pressure sensitive switches may be different.

Figure 24:
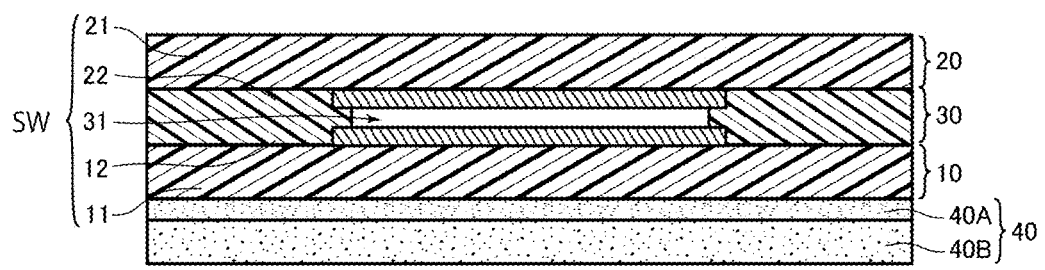
FIG. 24 is a diagram of the configuration of a cushion member according to still another embodiment.

In the above embodiments, the cushion member 40 attached to the under face of the first insulating sheet 11 has a single layer structure. However, the cushion member 40 may have a two-layer structure. More specifically, as illustrated in FIG. 24, a first cushion member 40A is attached to the under face of the first insulating sheet 11. A second cushion member 40B is attached to the under face of the first cushion member 40A. The rigidity of the second cushion member 40B is smaller than the rigidity of the first cushion member 40A.

In this case, the first cushion member 40A functions as a member that mainly adjusts the extent of deformation of the first insulating sheet 11. The second cushion member 40B functions as a member that mainly relaxes a load applied from the cushion pad 60.

Therefore, the first cushion member 40A and the second cushion member 40B can improve the durability of the pressure sensitive switch SW, SW11, or SW12 as well as can adjust the sensitivity of the pressure sensitive switch SW, SW11, or SW12, compared with the case in which the first cushion member 40A and the second cushion member 40B are formed into single layer cushion members corresponding to the second cushion member 40B.

The first cushion member 40A only has to have the rigidity in which the first cushion member 40A is distorted by the thickness of the spacer 30. In the case in which the thickness of the first cushion member 40A having the rigidity greater than the rigidity of the second cushion member 40B is smaller than the thickness of the second cushion member 40B, this is more preferable from the viewpoint in which the durability of the pressure sensitive switch SW, SW11, or SW12 is improved as well as the sensitivity is adjusted.

In the above embodiments, the shape of the spring 73 is in an S-shape. However, various shapes are applicable, such as a Z-shape. The bent portions of the springs 73 may be continuously repeatedly spaced, may be provided with a predetermined spacing, or may be randomly spaced. The bent portions in the same shape may be repeated, or the bent portions in different shapes may be repeated. For example, an S-shape is combined with a Z-shape, or a U-shape is combined with an inverted U-shape. The bent portions do not necessarily have to be repeated. However, the bent portions are preferably repeated. The plurality of springs 73 is extended in the longitudinal direction of the cushion pad 60. However, the plurality of springs 73 may be extended in the lateral direction or in the oblique direction.

The components of the seat device 5 can be appropriately combined, omitted, modified, and added with techniques known to persons skilled in the art within the scope not deviating from the object of the present specification, other than the content described in the above first to fifth embodiments or another embodiment.

INDUSTRIAL APPLICABILITY

The present invention is applicable to the seat of a conveyance, such as vehicles. The present invention is specifically applicable to seats that have to wear a seat belt.

REFERENCE SIGNS LIST

1 . . . seat sensor
5 . . . seat device
10 . . . first electrode sheet
11 . . . first insulating sheet
12 . . . first electrode
13, 23 . . . terminal
20 . . . second electrode sheet
21 . . . second insulating sheet
22 . . . second electrode
30 . . . spacer
31 . . . opening
32 . . . slit
40 to 43 . . . cushion member
40A . . . first cushion member
40B . . . second cushion member
50 . . . recess
60 . . . cushion pad
70 . . . cushion mounting unit
71 . . . stand
72 . . . support frame
73 . . . spring
75 . . . seat pan
80, 200 . . . sensor mounting stage
90, 100, 110, 120, 130 . . . pressing member
91, 111 . . . base
92 . . . pad rest
93, 103, 113 . . . first flexible portion
94, 104, 114 . . . second flexible portion
150 . . . reinforcing member
SW, SW20, SW11, SW12 . . . pressure sensitive switch

The invention claimed is:

1. A seat device comprising:
   a cushion pad;
   a support member for supporting the cushion pad;
   a pressure sensitive switch disposed with a spacing from an under face of the cushion pad; and
   a pressing member disposed below the cushion pad, the pressing member being deformed by a pressure applied from the under face of the cushion pad to press the pressure sensitive switch, wherein
   a deformed amount of a part of the pressing member per unit displacement amount in which the under face of the cushion pad is displaced downwardly is greater in a second stage after the pressure sensitive switch is turned on than in a first stage before the pressure sensitive switch is turned on,
   wherein the pressing member has a first flexible portion and a second flexible portion joined to the first flexible portion, and
   the second flexible portion is bent after a bending amount of the first flexible portion exceeds a predetermined amount.

2. The seat device according to claim 1, comprising
   a base disposed in a region in which the base does not overlap with switching devices configuring the pressure sensitive switch in a vertical direction, wherein
   the base is joined to the first flexible portion or the second flexible portion.

3. The seat device according to claim 1, wherein
   the pressure sensitive switch includes a first pressure sensitive switch and a second pressure sensitive switch,
   the pressing member includes
      a first pressing member deformed by a pressure applied from the under face of the cushion pad to press the first pressure sensitive switch and
      a second pressing member deformed by a pressure applied from the under face of the cushion pad to press the second pressure sensitive switch,
   the first pressure sensitive switch is turned on through the first pressing member when a first weight or greater is applied from a seat face of the cushion pad, and
   the second pressure sensitive switch is turned on through the second pressing member when a second weight or greater is applied from the seat face of the cushion pad, the second weight being greater than the first weight.

4. The seat device according to claim 1, further comprising
   a reinforcing member provided between the pressing member and the cushion pad opposed to the pressing member, the reinforcing member having rigidity greater than rigidity of the cushion pad, wherein
   the reinforcing member is moved together with the cushion pad being displaced.

5. The seat device according to claim 1, wherein, in the first stage which is before the pressure sensitive switch is turned on, the pressing member contacts the under face of the cushion pad and the part of the pressing member is deformed by a pressure applied from downwardly displaced cushion pad.

6. The seat device according to claim 1, wherein
   the second flexible portion has a bending amount greater than a bending amount of the first flexible portion per unit pressure.

7. The seat device according to claim 6, comprising
   a base disposed in a region in which the base does not overlap with switching devices configuring the pressure sensitive switch in a vertical direction, wherein
   the base is joined to the first flexible portion or the second flexible portion.

8. The seat device according to claim 1, further comprising
   a member that is not moved together with the cushion pad being displaced due to a person taking a seat, wherein
   the pressure sensitive switch is supported on the member with a spacing from the under face of the cushion pad.

9. The seat device according to claim 8, wherein
   the member is integrally formed with the support member.

10. The seat device according to claim 1, wherein
    the support member includes
       a frame member having an opening and
       a plurality of springs extended over the opening,
    the seat device further includes a sensor mounting stage mounted on a part of the plurality of springs, and
    the pressure sensitive switch is disposed on the sensor mounting stage with a spacing from the under face of the cushion pad.

11. The seat device according to claim 10, wherein
    the pressure sensitive switch is disposed on the sensor mounting stage so that a portion of the pressure sensitive switch nearest to the under face of the cushion pad is located lower than a portion of the sensor mounting stage nearest to the under face of the cushion pad.

12. The seat device according to claim 11, wherein
    the pressing member is disposed so that a portion of the pressing member nearest to the under face of the cushion pad is located lower than a portion of the sensor mounting stage nearest to the under face of the cushion pad.

* * * * *